United States Patent
Shrestha et al.

(10) Patent No.: US 11,751,108 B2
(45) Date of Patent: Sep. 5, 2023

(54) EXECUTION OF REDUCED SIGNALING HANDOVER

(71) Applicant: QUALCOMM Incorporated, San Diego, CA (US)

(72) Inventors: Bharat Shrestha, San Diego, CA (US); Prasad Reddy Kadiri, San Diego, CA (US); Umesh Phuyal, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/444,143

(22) Filed: Jul. 30, 2021

(65) Prior Publication Data
US 2022/0046491 A1 Feb. 10, 2022

Related U.S. Application Data

(60) Provisional application No. 62/706,220, filed on Aug. 5, 2020.

(51) Int. Cl.
*H04W 36/00* (2009.01)
(52) U.S. Cl.
CPC .............................. *H04W 36/0055* (2013.01)
(58) Field of Classification Search
CPC ...................... H04W 36/055; H04W 36/0009
See application file for complete search history.

(56) References Cited

U.S. PATENT DOCUMENTS

| 2010/0330993 | A1* | 12/2010 | Kone | H04W 36/0079 |
| | | | | 455/436 |
| 2015/0105084 | A1* | 4/2015 | Bontu | H04W 36/0072 |
| | | | | 455/437 |
| 2017/0289864 | A1* | 10/2017 | Narasimha | H04W 36/0009 |
| 2019/0223073 | A1* | 7/2019 | Chen | H04W 36/0058 |
| 2020/0120560 | A1* | 4/2020 | Sunell | H04W 36/08 |

(Continued)

FOREIGN PATENT DOCUMENTS

WO WO-2021005575 A1 1/2021

OTHER PUBLICATIONS

Interdigital Inc: "Mobility Enhancements for Non-Terrestrial Networks", 3GPP Draft, 3GPP RAN WG2 Meeting #106, R2-1908245 Mobility Enhancements for Non-Terrestrial Networks, 3rd Generation Partnership Project (3GPP), Mobile Competence Centre, 650, Route Des Lucioles, F-06921 Sophia-Antipolis Ce, vol. RAN WG2, No. Reno, United States, May 13-May 17, 2019, May 18, 2019 (May 18, 2019), XP051740398, 6 Pages, Retrieved from the Internet: URL: http://www.3gpp.org/ftp/tsg%5Fran/WG2%5FRL2/TSGR2%5F106/Docs/R2%2D1908245%2Ezip [Retrieved on May 18, 2019] the whole document.

(Continued)

*Primary Examiner* — Barry W Taylor
(74) *Attorney, Agent, or Firm* — Harrity & Harrity, LLP

(57) ABSTRACT

Various aspects of the present disclosure generally relate to wireless communication. In some aspects, a user equipment (UE) may determine that a reduced signaling handover condition has occurred. The UE may execute a reduced signaling handover from a source base station to a target base station based at least in part on determining that the reduced signaling handover condition has occurred. Numerous other aspects are described.

33 Claims, 9 Drawing Sheets

(56) References Cited

U.S. PATENT DOCUMENTS

| | | | |
|---|---|---|---|
| 2020/0296635 A1* | 9/2020 | Rastegardoost | H04W 36/0055 |
| 2020/0314717 A1* | 10/2020 | Kim | H04W 74/0833 |
| 2020/0314914 A1* | 10/2020 | Roy | H04W 24/10 |
| 2020/0338077 A1* | 10/2020 | Rodgers | A61P 29/00 |
| 2021/0377825 A1* | 12/2021 | Deenoo | H04W 48/12 |
| 2021/0399797 A1* | 12/2021 | Khan | H04W 36/30 |
| 2022/0038975 A1* | 2/2022 | Da Silva | H04W 36/08 |
| 2022/0256418 A1* | 8/2022 | Kawasaki | H04W 74/08 |
| 2022/0312283 A1* | 9/2022 | Chen | H04W 74/008 |
| 2022/0312291 A1* | 9/2022 | Xu | H04W 36/24 |

OTHER PUBLICATIONS

International Search Report and Written Opinion—PCT/US2021/071084—ISA/EPO—Nov. 30, 2021.

\* cited by examiner

EXECUTION OF REDUCED SIGNALING HANDOVER

CROSS-REFERENCE TO RELATED APPLICATION

This Patent application claims priority to U.S. Provisional Patent Application No. 62/706,220, filed on Aug. 5, 2020, entitled "EXECUTION OF REDUCED SIGNALING HANDOVER," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for execution of a reduced signaling handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining that a reduced signaling handover condition has occurred; and executing a reduced signaling handover from a source base station to a target base station based at least in part on determining that the reduced signaling handover condition has occurred.

In some aspects, a method of wireless communication performed by a target base station includes: determining that a reduced signaling handover condition relating to a UE has occurred; and determining that the UE has executed a reduced signaling handover from a source base station to the target base station.

In some aspects, a UE for wireless communication includes a memory and one or more processors coupled to the memory, the one or more processors configured to: determine that a reduced signaling handover condition has occurred; and execute a reduced signaling handover from a source base station to a target base station based at least in part on determining that the reduced signaling handover condition has occurred.

In some aspects, a target base station for wireless communication includes a memory and one or more processors coupled to the memory, the one or more processors configured to: determine that a reduced signaling handover condition relating to a UE has occurred; and determine that the UE has executed a reduced signaling handover from a source base station to the target base station.

In some aspects, a non-transitory computer-readable medium storing a set of instructions for wireless communication includes one or more instructions that, when executed by one or more processors of a UE, cause the UE to: determine that a reduced signaling handover condition has occurred; and execute a reduced signaling handover from a source base station to a target base station based at least in part on determining that the reduced signaling handover condition has occurred.

In some aspects, a non-transitory computer-readable medium storing a set of instructions for wireless communication includes one or more instructions that, when executed by one or more processors of a target base station, cause the target base station to: determine that a reduced signaling handover condition relating to a UE has occurred; and determine that the UE has executed a reduced signaling handover from a source base station to the target base station.

In some aspects, an apparatus for wireless communication includes: means for determining that a reduced signaling handover condition has occurred; and means for executing a reduced signaling handover from a source base station to a target base station based at least in part on determining that the reduced signaling handover condition has occurred.

In some aspects, an apparatus for wireless communication includes: means for determining that a reduced signaling handover condition relating to a UE has occurred; and means for determining that the UE has executed a reduced signaling handover from a source base station to the target base station.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
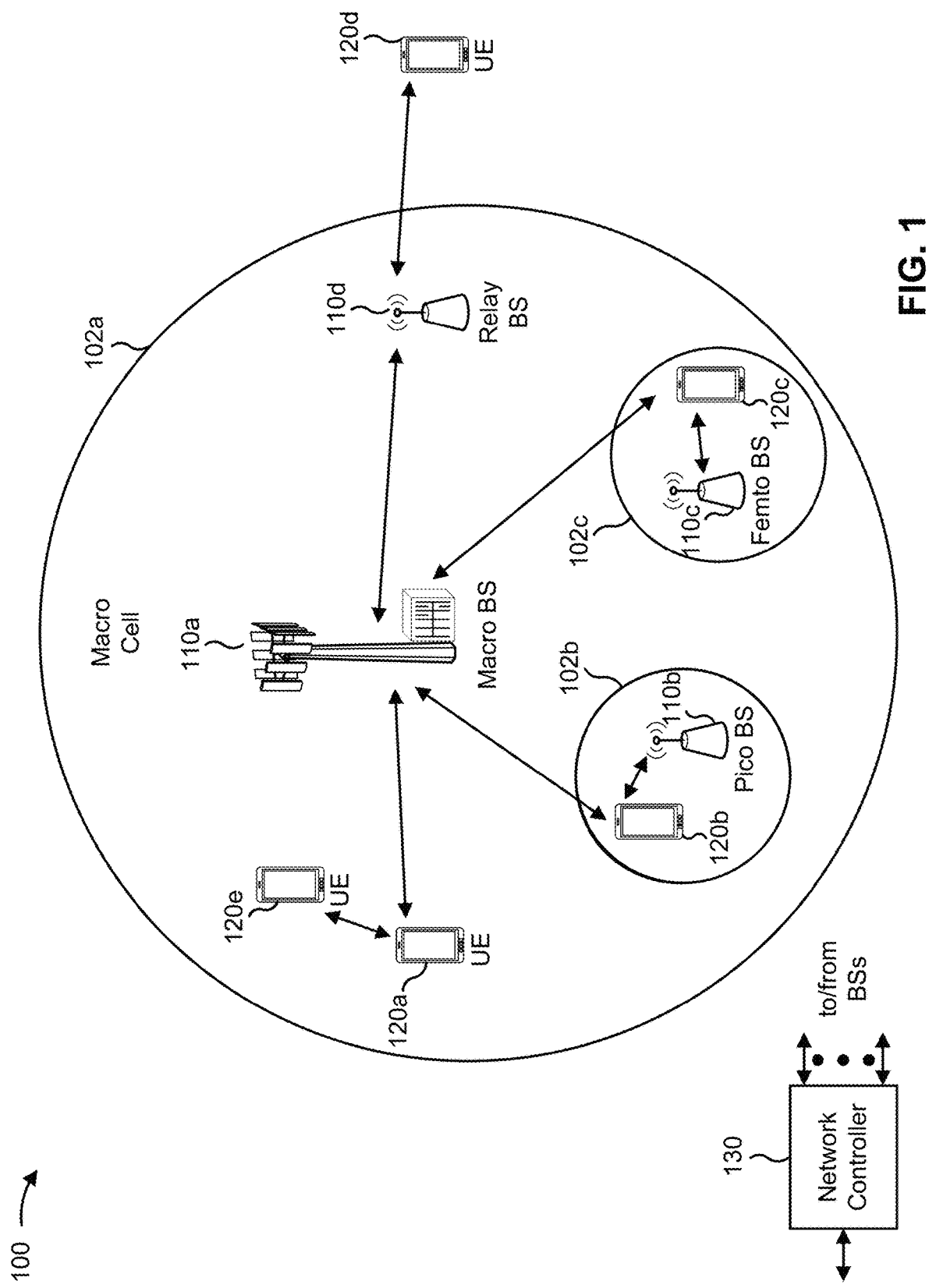
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the wireless network 100 may include one or more non-terrestrial network (NTN) deployments in which a non-terrestrial wireless communication device may include a BS (referred to herein, interchangeably, as a "non-terrestrial BS" and "non-terrestrial base station") and/or a relay station (referred to herein, interchangeably, as a "non-terrestrial relay station"). As used herein, "NTN" may refer to a network for which access is facilitated by a non-terrestrial BS and/or a non-terrestrial relay station.

The wireless network 100 may include any number of non-terrestrial wireless communication devices. A non-terrestrial wireless communication device may include a satellite and/or a high-altitude platform (HAP). A HAP may include a balloon, a dirigible, an airplane, and/or an unmanned aerial vehicle, among other examples. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, and/or one or more components and/or devices included in a core network of wireless network 100.

As indicated above, FIG. 1 is provided as an example. Other examples may differ from what is described with regard to FIG. 1.

Figure 2:
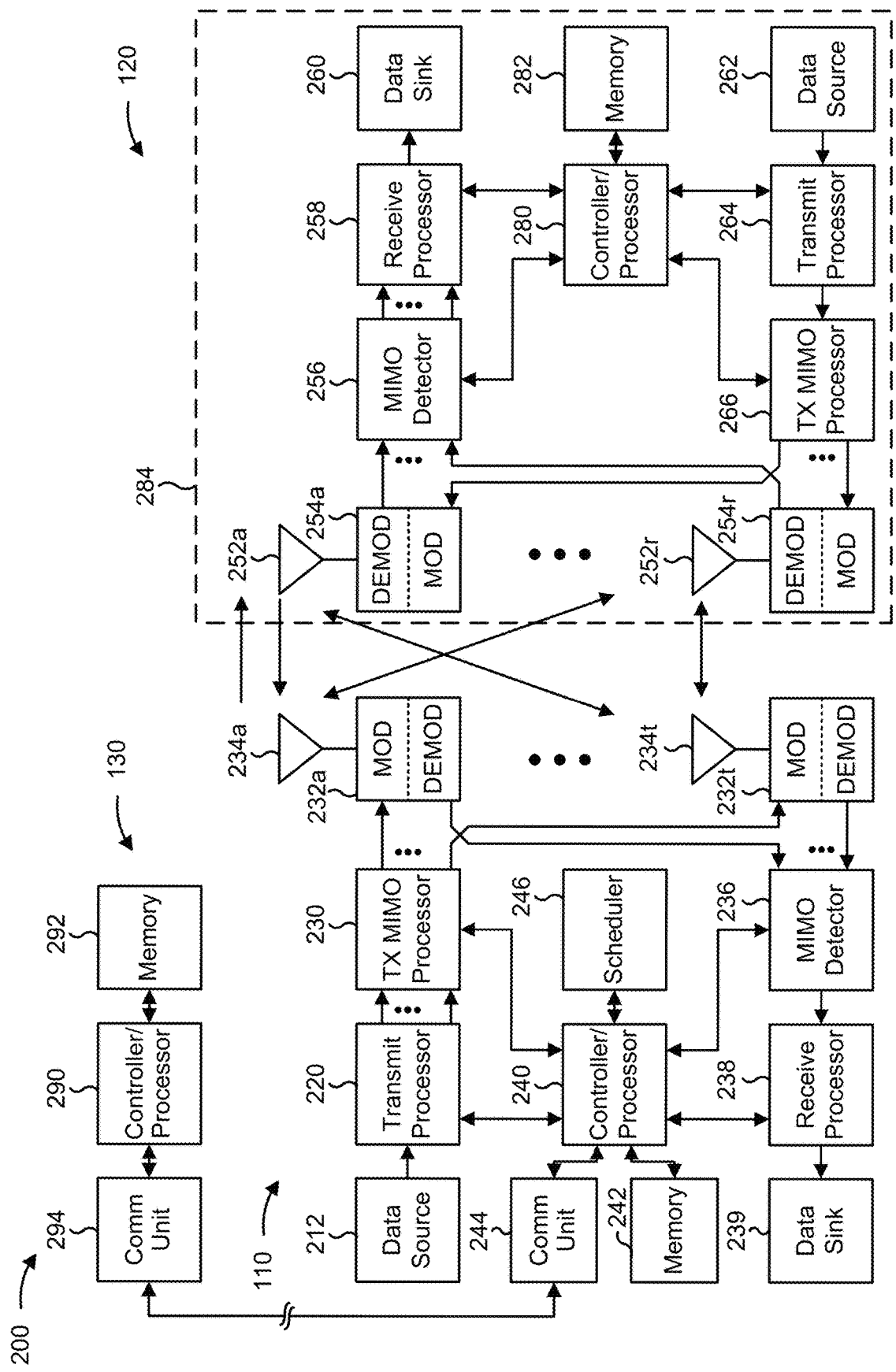
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9.)

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9.)

The controller/processor 240 of the base station 110, the controller/processor 280 of the UE 120, and/or any other component(s) of FIG. 2 may perform one or more techniques associated with execution of a reduced signaling handover, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, UE 120 may include means for determining that a reduced signaling handover condition has occurred; and/or means for executing a reduced signaling handover from a source base station to a target base station based at least in part on determining that the reduced signaling handover condition has occurred. In some aspects, such means may include one or more components of UE 120 described in connection with FIG. 2, such as controller/processor 280, transmit processor 264, TX MIMO processor 266, modem 254, antenna 252, MIMO detector 256, receive processor 258, and/or memory 282.

In some aspects, base station 110 may include means for determining that a reduced signaling handover condition relating to a UE has occurred; and/or means for determining that the UE has executed a reduced signaling handover from a source base station to the target base station. In some aspects, such means may include one or more components of base station 110 described in connection with FIG. 2, such as antenna 234, modem 232, MIMO detector 236, receive processor 238, controller/processor 240, transmit processor 220, TX MIMO processor 230, and/or memory 242.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
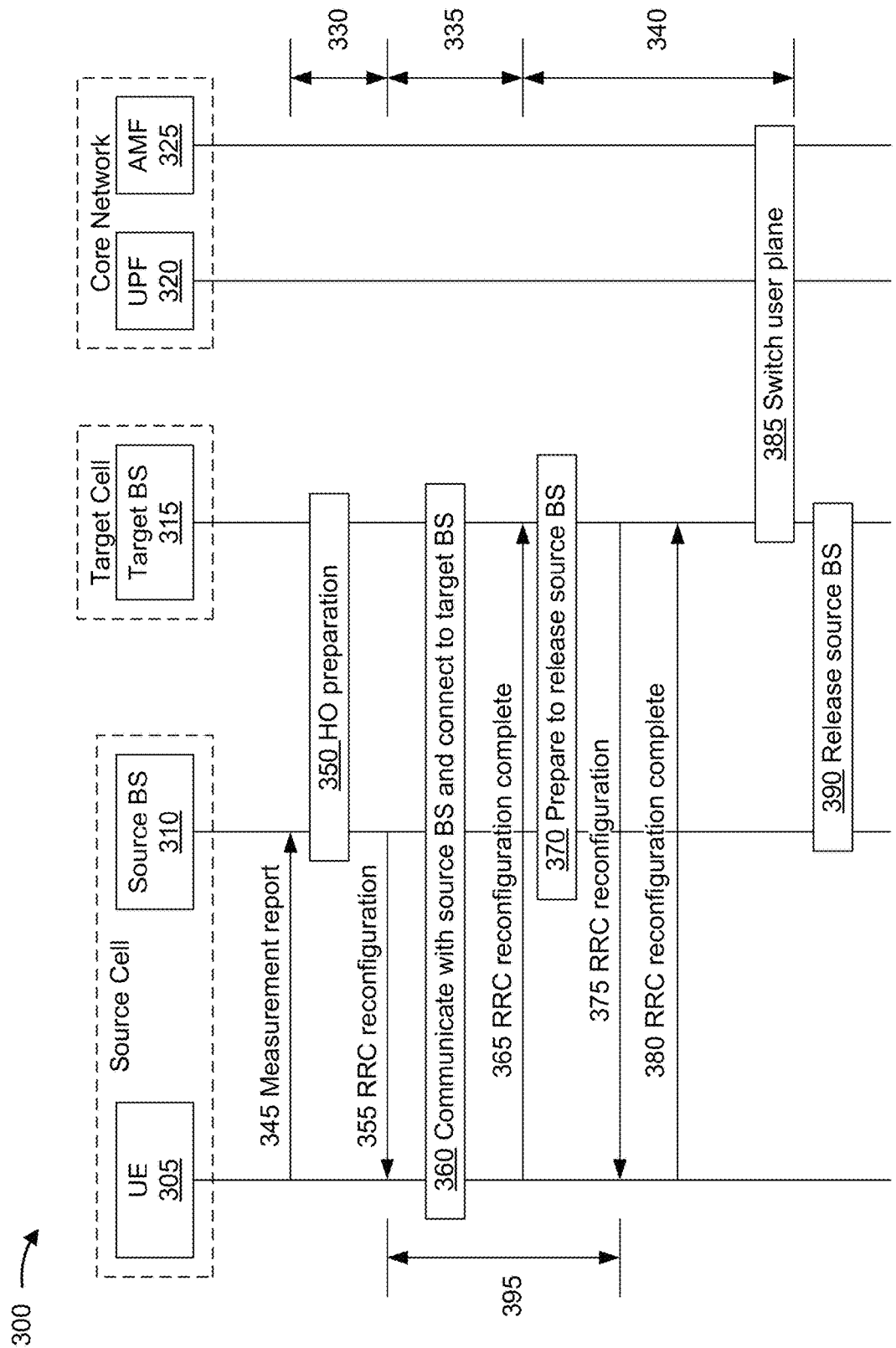
FIG. 3 is a diagram illustrating an example of a handover, in accordance with the present disclosure.

FIG. 3 is a diagram illustrating an example 300 of a handover, in accordance with the present disclosure.

As shown in FIG. 3, a make-before-break (MBB) handover procedure may involve a UE 305, a source base station 310, a target base station 315, a user plane function (UPF) device 320, and an access and mobility management function (AMF) device 325. The UE 305 may correspond to the UE 120 described elsewhere herein. The source base station 310 and/or the target base station 315 may correspond to the base station 110 described elsewhere herein. The UPF device 320 and/or the AMF device 325 may correspond to the network controller 130 described elsewhere herein. The UE 305 and the source base station 310 may be connected (e.g., may have a radio resource control (RRC) connection) via a serving cell or a source cell, and the UE 305 may undergo a handover to the target base station 315 via a target cell. The UPF device 320 and/or the AMF device 325 may be located within a core network. The source base station 310 and the target base station 315 may be in communication with the core network for mobility support and user plane functions. The MBB handover procedure may include an enhanced MBB (eMBB) handover procedure.

As shown, the MBB handover procedure may include a handover preparation phase 330, a handover execution phase 335, and a handover completion phase 340. During the handover preparation phase 330, the UE 305 may report measurements that cause the source base station 310 and/or the target base station 315 to prepare for handover and trigger execution of the handover. During the handover execution phase 335, the UE 305 may execute the handover by performing a random access procedure with the target base station 315 and establishing an RRC connection with the target base station 315. During the handover completion phase 340, the source base station 310 may forward stored communications associated with the UE 305 to the target base station 315, and the UE 305 may be released from a connection with the source base station 310.

As shown by reference number 345, the UE 305 may perform one or more measurements, and may transmit a measurement report to the source base station 310 based at least in part on performing the one or more measurements (e.g., serving cell measurements and/or neighbor cell measurements). The measurement report may indicate, for example, an RSRP parameter, an RSRQ parameter, an RSSI parameter, and/or a signal-to-interference-plus-noise-ratio (SINR) parameter (e.g., for the serving cell and/or one or more neighbor cells). The source base station 310 may use the measurement report to determine whether to trigger a handover to the target base station 315. For example, if one or more measurements satisfy a condition, then the source base station 310 may trigger a handover of the UE 305 to the target base station 315.

As shown by reference number 350, the source base station 310 and the target base station 315 may communicate with one another to prepare for a handover of the UE 305. As part of the handover preparation, the source base station 310 may transmit a handover request to the target base station 315 to instruct the target base station 315 to prepare for the handover. The source base station 310 may communicate RRC context information associated with the UE 305 and/or configuration information associated with the UE 305 to the target base station 315. The target base station 315 may prepare for the handover by reserving resources for the UE 305. After reserving the resources, the target base station 315 may transmit an acknowledgement (ACK) to the source base station 310 in response to the handover request.

As shown by reference number 355, the source base station 310 may transmit an RRC reconfiguration message to the UE 305. The RRC reconfiguration message may include a handover command instructing the UE 305 to execute a handover procedure from the source base station 310 to the target base station 315. The handover command may include information associated with the target base station 315, such as a random access channel (RACH) preamble assignment for accessing the target base station 315. Reception of the RRC reconfiguration message, including the handover command, by the UE 305 may trigger the start of the handover execution phase 335.

As shown by reference number 360, during the handover execution phase 335 of the MBB handover, the UE 305 may execute the handover by performing a random access procedure with the target base station 315 (e.g., including synchronization with the target base station 315) while continuing to communicate with the source base station 310. For example, while the UE 305 is performing the random access procedure with the target base station 315, the UE 305 may transmit uplink data, uplink control information, and/or an uplink reference signal (e.g., a sounding reference signal) to the source base station 310, and/or may receive downlink data, downlink control information, and/or a downlink reference signal from the source base station 310.

As shown by reference number 365, upon successfully establishing a connection with the target base station 315 (e.g., via a random access procedure), the UE may transmit an RRC reconfiguration completion message to the target base station 315. Reception of the RRC reconfiguration message by the target base station 315 may trigger the start of the handover completion phase 340.

As shown by reference number 370, the source base station 310 and the target base station 315 may communicate with one another to prepare for release of the connection between the source base station 310 and the UE 305. In some aspects, the target base station 315 may determine that a connection between the source base station 310 and the UE 305 is to be released, such as after receiving the RRC reconfiguration complete message from the UE 305. In this case, the target base station 315 may transmit a handover connection setup completion message to the source base station 310. The handover connection setup completion message may cause the source base station 310 to stop transmitting data to the UE 305 and/or to stop receiving data from the UE 305. Additionally, or alternatively, the handover connection setup completion message may cause the source base station 310 to forward communications associated with the UE 305 to the target base station 315 and/or to notify the target base station 315 of a status of one or more communications with the UE 305. For example, the source base station 310 may forward, to the target base station 315, buffered downlink communications (e.g., downlink data) for the UE 305 and/or uplink communications (e.g., uplink data) received from the UE 305. Additionally, or alternatively, the source base station 310 may notify the target base station 315 regarding a packet data convergence protocol (PDCP) status associated with the UE 305 and/or a sequence number to be used for a downlink communication with the UE 305.

As shown by reference number 375, the target base station 315 may transmit an RRC reconfiguration message to the UE 305 to instruct the UE 305 to release the connection with the source base station 310. Upon receiving the instruction to release the connection with the source base station 310, the UE 305 may stop communicating with the source base station 310. For example, the UE 305 may refrain from transmitting uplink communications to the source base station 310 and/or may refrain from monitoring for downlink communications from the source base station 310.

As shown by reference number 380, the UE may transmit an RRC reconfiguration completion message to the target base station 315 to indicate that the connection between the source base station 310 and the UE 305 is being released or has been released.

As shown by reference number 385, the target base station 315, the UPF device 320, and/or the AMF device 325 may communicate to switch a user plane path of the UE 305 from the source base station 310 to the target base station 315. Prior to switching the user plane path, downlink communications for the UE 305 may be routed through the core network to the source base station 310. After the user plane path is switched, downlink communications for the UE 305 may be routed through the core network to the target base station 315. Upon completing the switch of the user plane path, the AMF device 325 may transmit an end marker message to the source base station 310 to signal completion of the user plane path switch. As shown by reference number 390, the target base station 315 and the source base station 310 may communicate to release the source base station 310.

As part of the MBB handover procedure, the UE 305 may maintain simultaneous connections with the source base station 310 and the target base station 315 during a time period 395. The time period 395 may start at the beginning of the handover execution phase 335 (e.g., upon reception by the UE 305 of a handover command from the source base station 310) when the UE 305 performs a random access procedure with the target base station 315. The time period 395 may end upon release of the connection between the UE 305 and the source base station 310 (e.g., upon reception by the UE 305 of an instruction, from the target base station 315, to release the source base station 310). By maintaining simultaneous connections with the source base station 310 and the target base station 315, the handover procedure can be performed with zero or a minimal interruption to communications, thereby reducing latency.

As indicated above, FIG. 3 is provided as an example. Other examples may differ from what is described with respect to FIG. 3.

Figure 4:
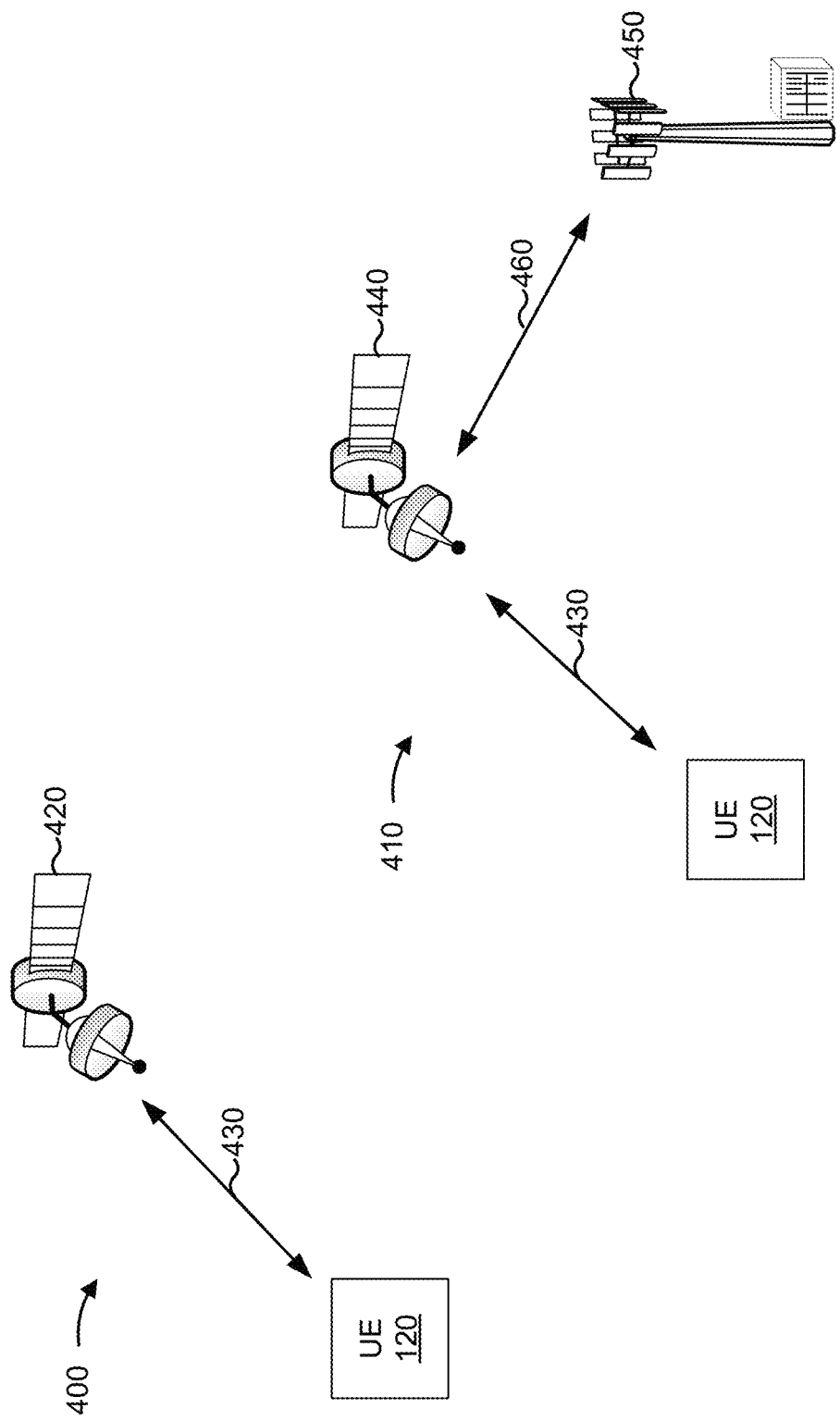
FIG. 4 is a diagram illustrating an example of a regenerative satellite deployment and an example of a transparent satellite deployment in a non-terrestrial network, in accordance with the present disclosure.

FIG. 4 is a diagram illustrating an example 400 of a regenerative satellite deployment and an example 410 of a transparent satellite deployment in a non-terrestrial network, in accordance with the present disclosure.

Example 400 shows a regenerative satellite deployment. In example 400, a UE 120 is served by a satellite 420 via a service link 430. For example, the satellite 420 may include a base station 110 (e.g., BS 110a), a gNB, or the like. In some aspects, the satellite 420 may be referred to as a non-terrestrial base station, a regenerative repeater, and/or an on-board processing repeater. In some aspects, the satellite 420 may demodulate an uplink radio frequency signal and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. As used herein, a transparent satellite (e.g., satellite 440) refers to any satellite that relays signals received from a base station or gateway (e.g., gateway 450) to a UE (e.g., UE 120) and/or relays signals received from a UE (e.g., UE 120) to a base station or gateway (e.g., gateway 450). The satellite 440 may relay a signal received from a gateway 450 via a feeder link 460. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460, and the satellite may amplify and/or filter the uplink radio frequency transmission. In some aspects, the UEs 120 shown in example 400 and example 410 may be associated with a Global Navigation Satellite System (GNSS) capability and/or a Global Positioning System (GPS) capability, though not all UEs have such capabilities. The satellite 440 may provide a cell that covers the UE 120.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120).

The feeder link 460 and the service link 430 may each experience Doppler effects due to the movement of the satellites 420 and 440, and potentially movement of a UE 120. These Doppler effects may be significantly larger than in a terrestrial network. The Doppler effect on the feeder link 460 may be compensated for to some degree, but the Doppler effect may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

In some aspects, a device, such as an aircraft, drone, blimp, and/or hot air balloon, among other examples, may be used instead of or in addition to the transparent satellite 440 to relay signals received from a base station or gateway to a UE and/or relay signals received from a UE to a base station or gateway.

As indicated above, FIG. 4 is provided as an example. Other examples may differ from what is described with regard to FIG. 4.

Figure 5:
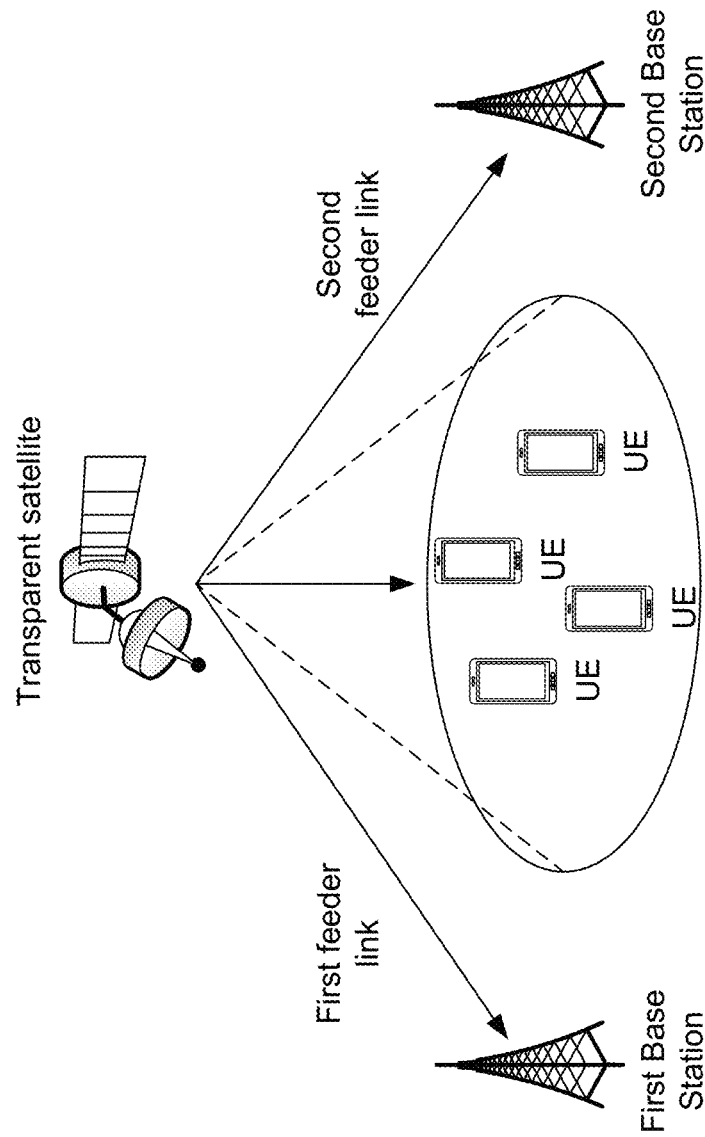
FIG. 5 is a diagram illustrating an example of switching feeder links in a transparent satellite deployment, in accordance with the present disclosure.

FIG. 5 is a diagram illustrating an example 500 of switching feeder links in a transparent satellite deployment, in accordance with the present disclosure. As shown in FIG. 5, a transparent satellite provides a cell that covers multiple UEs. The transparent satellite may relay, to the UEs, downlink communications received from a first base station via a first feeder link. The transparent satellite may also relay uplink communications, received from the UEs, to the first base station via the first feeder link.

When the transparent satellite moves, the transparent satellite may switch to a different feeder link associated with a different base station. For example, the transparent satellite may switch from the first feeder link between the transparent satellite and the first base station to a second feeder link between the transparent satellite and a second base station. Such a switch from the first feeder link to the second feeder link may be a result of the first base station no longer being in a coverage area associated with the transparent satellite, as the transparent satellite moves.

When the transparent satellite switches from the first feeder link to the second feeder link, the transparent satellite connects to the second base station. This prompts a group handover of all the UEs being served by the transparent satellite from the first base station (e.g., source base station) to the second base station (e.g., target base station). However, using a current handover procedure for such a group handover may be inefficient. In the current handover procedure, the UEs are sent dedicated handover commands. Furthermore, in the current handover procedure, the UEs transmit respective RRC reconfiguration complete messages to the target base station to indicate that the handover is complete. As a result, significant congestion may be created in the target base station when a large number of UEs try to connect to the target base station due to the group handover. This may cause a decrease in network speed and reliability and consume computing resources (e.g., processing resources, memory resources, and/or communication resources) and/or networking resources.

Some techniques and apparatuses described herein enable a UE to perform a reduced signaling handover when a reduced signaling handover condition occurs. The reduced signaling handover condition may be associated with a group handover of multiple UEs in a cell provided by a transparent satellite. The reduced signaling handover may be performed without transmitting an RRC reconfiguration complete message to the target base station. As a result, congestion in the target base station due to a group handover involving multiple UEs may be reduced. This may reduce network resources and signaling overhead used for the group handover, thus increasing network speed and reliability and conserving computing resources (e.g., processing resources, memory resources, and/or communication resources) and/or networking resources that would otherwise be consumed by additional signaling between the target base station and the UEs.

As indicated above, FIG. 5 is provided as an example. Other examples may differ from what is described with respect to FIG. 5.

Figure 6:
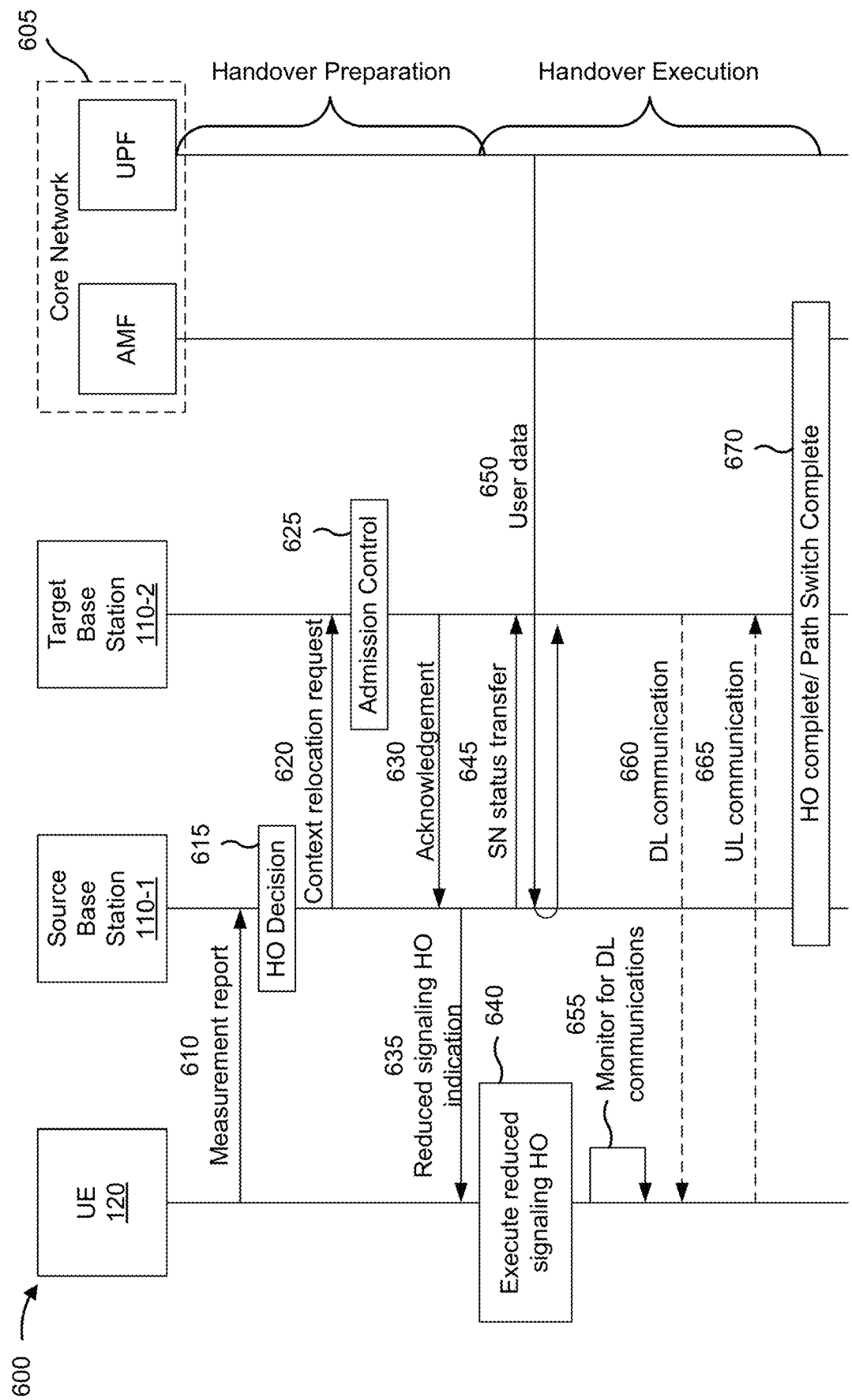
FIGS. 6-7 are diagrams illustrating examples associated with execution of a reduced signaling handover, in accordance with the present disclosure.

FIG. 6 is a diagram illustrating an example 600 associated with execution of a reduced signaling handover, in accordance with the present disclosure. As shown in FIG. 6, example 600 includes communication between a UE 120, a source base station 110-1 and a target base station 110-2. In some aspects, the UE 120, the source base station 110-1, and the target base station 110-2 may be included in a wireless network, such as wireless network 100. The UE 120, the source base station 110-1, and the target base station 110-2 may communicate on wireless access links, which may include uplinks and downlinks. The source base station 110-1 and the target base station 110-2 may communicate with an AMF and a UPF (or multiple UPFs) in a core network 605 for mobility support and user plane functions.

In some aspects, the UE 120 may communicate with the source base station 110-1 and/or the target base station 110-2 via a transparent satellite (e.g., transparent satellite 440). The UE 120 may transmit uplink communications to the transparent satellite on a service link, and the transparent satellite may transmit the uplink communications to the source base station 110-1 and/or the target base station 110-2 on a feeder link. The source base station 110-1 and/or the target base station 110-2 may transmit downlink communications to the transparent satellite on the feeder link, and the transparent satellite may transmit the downlink communications to the UE 120 on the service link. In some aspects, the UE 120 and one or more other UEs may communicate with the source base station 110-1 and/or the target base station 110-2 via the transparent satellite. In some aspects, the UE 120 (and/or one or more other UEs) may communicate with the source base station 110-1 and/or the target base station 110-2 via a relay device, such as an aircraft, drone, blimp, and/or hot air balloon, among other examples.

As shown in FIG. 6, and by reference number 610, the UE 120 may transmit a measurement report to the source base station 110-1. The source base station 110-1 may receive the measurement report transmitted by the UE 120 and may receive one or more measurement reports transmitted from one or more other UEs. In some aspects, the UE 120 may transmit the measurement report to the source base station 110-1 via the transparent satellite. In some aspects, the source base station 110-1 may receive the measurement reports from the UE 120 and one or more other UEs in a cell provided by the transparent satellite.

The measurement report may include one or more measurements (e.g., serving cell measurements and/or neighbor cell measurements) performed by the UE 120. The measurement report may indicate, for example, an RSRP parameter, an RSRQ parameter, an RSSI parameter, and/or an SINR parameter (e.g., for the serving cell and/or one or more neighbor cells). In some aspects, the source base station 110-1 may also receive location information relating to a location of the transparent satellite and/or a location of the UE 120. The location information may be received in the measurement report transmitted from the UE 120 or may be received from the transparent satellite.

As further shown in FIG. 6, and by reference number 615, the source base station 110-1 may determine whether a handover to the target base station 110-2 is to be performed. In some aspects, the source base station 110-1 may use the measurement report to determine whether to trigger the handover to the target base station 110-2. For example, if one or more measurements satisfy a condition, the source base station 110-1 may trigger a handover of the UE 120 to the target base station 110-2.

In some aspects, the source base station 110-1 may determine whether a reduced signaling handover of the UE 120 is to be performed. The source base station 110-1 may determine whether a reduced signaling handover condition has occurred. The reduced signaling handover condition is a condition that triggers the reduced signaling handover of the UE 120. The reduced signaling handover condition may be based at least in part on a position of the transparent satellite and/or a timer associated with the transparent satellite. For example, the reduced signaling handover condition may occur when the position of the transparent satellite and/or the timer associated with the transparent satellite indicate that the source base station 110-1 will no longer be in a coverage area associated with the transparent satellite. The reduced signaling handover condition may correspond to a group handover of the UE 120 and one or more other UEs. For example, the source base station 110-1 may determine that a group handover of the UE 120 and the one or more other UEs is to be performed.

As further shown in FIG. 6, and by reference number 620, when the source base station 110-1 determines that the handover of the UE 120 to the target base station 110-2 is to be performed, the source base station 110-1 sends a context relocation request to the target base station 110-2. The context relocation request may include RRC context information associated with the UE 120 and/or configuration information associated with the UE 120. In some aspects, when the source base station 110-1 determines that the group handover of the UE 120 and one or more other UEs is to be performed, the context relocation request may include a list of RRC context information and/or configuration information associated with the UEs (e.g., the UE 120 and the one or more other UEs) involved in the group handover. In some aspects, the source base station 110-1 may send, to the target base station 110-2, multiple context relocation requests associated with the multiple UEs (e.g., the UE 120 and the one or more other UEs) involved in the group handover.

As further shown in FIG. 6, and by reference number 625, the target base station 110-2 may perform admission control based at least in the context relocation request(s) received from the source base station 110-1. The target base station 110-2 may determine reserve resources for the target UE 120 to prepare for the handover. The target base station 110-2 may also reserve resources for the one or more other UEs in the case of the group handover.

As further shown in FIG. 6, and by reference number 630, after reserving resources for the UE 120, the target base station 110-2 may transmit an acknowledgement to the source base station 110-1 in connection with the context relocation request. In the case of the group handover involving the UE 120 and the one or more other UEs, the target base station 110-2 may transmit, to the source base station 110-1, multiple acknowledgements (e.g., a list of acknowledgements) in connection with the multiple context relocation requests for the UEs (e.g., the UE 120 and the one or more other UEs).

As further shown in FIG. 6, and by reference number 635, the UE 120 may receive, from the source base station 110-1, a reduced signaling handover indication. In some aspects, the source base station 110-1 may transmit the reduced signaling handover indication to the UE 120 via the transparent satellite. In some aspects, the reduced signaling handover indication may be a group handover indication transmitted by the source base station 110-1 to the UE 120 and the one or more other UEs to trigger the group handover of the UE 120 and the one or more other UEs to the target base station 110-2. In some aspects, the reduced signaling handover indication may be a UE-specific handover indication transmitted from the source base station 110-1 to the UE 120.

The reduced signaling handover indication may indicate to the UE 120 that a reduced signaling handover condition has occurred and may trigger the UE 120 to execute a reduced signaling handover. In some aspects, the reduced signaling handover indication may include a common configuration associated the target base station 110-2 to be used by the UE 120 (and the one or more other UEs) when executing the reduced signaling handover. In some aspects, the reduced signaling handover indication may not provide a configuration associated with the target base station 110-2. In some aspects, the UE 120 may store a pre-configured handover command, and the reduced signaling handover indication may include a validation of the preconfigured handover command and/or an indication to execute the preconfigured handover command.

As shown in the example 600 of FIG. 6, the reduced signaling handover indication may indicate to the UE 120 that the reduced signaling handover condition has occurred and may trigger the UE 120 to execute the reduced signaling handover. In some aspects, the UE 120 may receive (e.g., from the source base station 110-1) a paging message (e.g., a short paging message) for at least one of a system information change, reduced signaling handover, or a context relocation. In this case, the paging message may indicate to the UE 120 that the reduced signaling handover condition has occurred and may trigger the UE 120 to execute the reduced signaling handover.

In some aspects, the UE 120 (and/or the one or more other UEs) may autonomously determine that the reduced signaling handover condition has occurred. The UE 120 may trigger the reduced signaling handover based at least in part on the determination that the reduced signaling handover condition has occurred. In this case, the UE 120 may not receive an indication (e.g., the reduced signaling handover indication) from the source base station 110-1 to trigger the reduced signaling handover. In some aspects, the UE 120 may determine that the reduced signaling handover condition has occurred based at least in part on a position of the transparent satellite and/or a timer associated with the transparent satellite. For example, the reduced signaling handover condition may be based at least in part on a position and/or time at which the transparent satellite switches from the feeder link associated with the source base station 110-1 to the feeder link associated with the target base station 110-2. In some aspects, the UE 120 may determine that the reduced signaling handover condition has occurred based at least in part on a timestamp associated with a preconfigured handover command stored by the UE 120.

As further shown in FIG. 6, and by reference number 640, the UE 120 may execute the reduced signaling handover. The UE 120 may execute the reduced signaling handover based at least in part on the determination that the reduced signaling handover condition has occurred. For example, as shown in FIG. 6, the reduced signaling handover indication may trigger the UE 120 to execute the reduced signaling handover. As used herein, a "reduced signaling handover" refers to a handover from a source base station (e.g., source base station 110-1) to a target base station (e.g., target base station 110-2) without at least one of an RRC reconfiguration complete message being transmitted from the UE 120 or an RRC reconfiguration message being received by the UE 120.

In some aspects, the reduced signaling handover may be a handover of the UE 120 to the target base station 110-2 that is executed by the UE 120 without transmitting an RRC reconfiguration complete message to the target base station 110-2 to indicate that the handover is complete. In some aspects, the UE 120 may not transmit any indication to the target base station 110-2 to indicate that the handover is complete. In some aspects, the UE 120 may transmit an indication other than the RRC reconfiguration complete message to indicate that the handover is complete. In some aspects, the UE 120 may execute the reduced signaling handover and begin monitoring for downlink communications without transmitting the RRC reconfiguration complete message, and may then transmit the RRC reconfiguration complete message after receiving one or more downlink communications from the target base station 110-2.

In some aspects, the reduced signaling handover may be a handover of the UE 120 to the target base station 110-2 that is executed by the UE 120 without receiving an RRC handover command to trigger the handover. In some aspects, the UE 120 may execute the reduced signaling handover by changing a security key for the UE 120, updating a round trip delay associated with the transparent satellite, and continuing to use a current cell RRC configuration (e.g., the RRC configuration for a source cell associated with the source base station 110-1).

In some aspects, the UE 120 may execute the reduced signaling handover by performing a suspend/resume process. When the reduced signaling handover is triggered (e.g., by the reduced signaling handover indication and/or another reduced signaling handover condition), the UE 120 may enter an RRC inactive state. The UE 120 may then resume an RRC connected state in connection with the target base station 110-2. For example, the UE 120 may resume the RRC connected state in connection with the target base station 110-2 immediately after entering the RRC inactive state. When the UE 120 resumes the RRC connected state in connection with the target base station 110-2, the UE 120 may resume using signaling radio bearers (SRBs) and dedicated radio bearers (DRBs) to receive communications (e.g., data and/or control signals) from and/or transmit communications to the target base station 110-2.

In some aspects, when resuming the RRC connected state, the UE 120 may continue using a current configuration of the SRBs and DRBs associated with the source base station 110-1. For example, the current configuration of SRBs and DRBs may include a DRB to quality of service (QoS) mapping rule and/or a robust header compression (ROHC) profile. Since the UE 120 may communicate with the source base station 110-1 and the target base station 110-2 via the transparent satellite, the UE 120 may continue using the same configuration of SRBs and DRBs associated with the source base station 110-1 to receive communications from and/or transmit communications to the target base station 110-2.

Once the UE 120 resumes the RRC connected state in connection with the target base station 110-2, the UE 120 may receive downlink communications, such as downlink data and/or a PDCP status report from the target base station 110-2 using the current configuration. The UE 120 may transmit a scheduling request to the target base station 110-2 using the current configuration, for example, if there is no uplink resource scheduled to transmit uplink data. Additionally, or alternatively, once the UE 120 resumes the RRC connected state in connection with the target base station 110-2, the target base station 110-2 may transmit an RRC reconfiguration message to the UE 120 to change the configuration of the UE 120. If the current configuration for the UE 120 is not accepted by the target base station 110-2, the source base station 110-1 may transmit a new handover command to the UE 120.

In some aspects, the UE 120 may receive a communication (e.g., a group-cast or UE-specific communication) that includes a common configuration of the target base station 110-2. For example, the reduced signaling handover indication, transmitted by the source base station 110-1, may include the common configuration of the target base station 110-2. In this case, when the UE 120 resumes the RRC connected state in connection with the target base station 110-2, the configuration of the UE 120 may be updated based at least in part on the common configuration of the target base station 110-2.

When the UE 120 resumes the RRC connected state in connection with the target base station 110-2, the UE 120 may derive one or more security keys associated with the target base station 110-2. The UE 120 may derive a KgNB security key and/or an access stratum (AS) security key based at least in part on a next hop chaining count (NCC) value. In some aspects, the UE 120 may use a current NCC value to derive the KgNB security key and/or the AS security key. That is, the UE 120 may assume that there is no change to the NCC value. In some aspects, the UE 120 may use an NCC value provided by the source base station 110-1 (for example, in the reduced signaling handover indication), to derive the KgNB security key and/or the AS security key.

In some aspects, the UE 120 may derive a contention free random access preamble and/or a physical random access channel (PRACH) resource for the suspend/resume reduced signaling handover based at least in part on a cell radio network temporary identifier (C-RNTI) associated with the UE 120. In some aspects, a RACH-less handover may be used.

In some aspects, by executing the reduced signaling handover using the suspend/resume process, the UE 120 may execute the handover from the source base station 110-1 to the target base station 110-2 without transmitting an acknowledgement to the source base station 110-1. In some aspects, when executing the reduced signaling handover using the suspend/resume process, the UE 120 may not send an indication to the target base station 110-2 to indicate that the handover has been completed. The UE 120 may begin monitoring for downlink communications from the target base station 110-2 without sending an RRC reconfiguration complete message or any other indication to the target base station 110-2 to indicate that the handover has been completed. In this case, a timer may be associated with the reduced signaling handover, and the target base station 110-2 may transmit downlink communications to the UE 120 after the timer expires.

In some aspects, the UE 120 may execute the reduced signaling handover by performing an RRC re-establishment procedure to establish a connection with the target base station 110-2. The RRC re-establishment procedure may be triggered when the UE 120 determines that the reduced signaling handover condition has occurred. For example, the RRC re-establishment procedure may be triggered by the UE 120 receiving the reduced signaling handover indication. The RRC re-establishment procedure may be triggered without the UE 120 transmitting an RRC re-establishment request and without the UE 120 receiving an RRC re-establishment message. In some aspects, the UE 120 may transmit an RRC re-establishment complete message to the target base station 110-2 when the RRC re-establishment procedure is complete. After the UE 120 performs the RRC re-establishment procedure to establish a connection with the target base station 110-2, the UE 120 may resume using SRBs and DRBs to receive communications (e.g., data and/or control signals) from and/or transmit communications to the target base station 110-2.

In some aspects, when executing the reduced signaling handover using the RRC re-establishment procedure, the UE 120 may continue using a current configuration of the SRBs and DRBs associated with the source base station 110-1. For example, once the RRC re-establishment procedure is performed, the UE 120 may resume using the current DRBs and associated AS security to receive communications from and/or transmit communications to the target base station 110-2. In some aspects, since the UE 120 may communicate with the source base station 110-1 and the target base station 110-2 via the transparent satellite, integrity protection and ciphering algorithms may not change in the RRC re-establishment procedure. Thus, the UE 120 may use the RRC re-establishment procedure to establish the connection with the target base station 110-2.

In some aspects, the UE 120 may receive a communication (e.g., a group-cast or UE-specific communication) that includes a common configuration of the target base station 110-2. For example, the reduced signaling handover indication, transmitted by the source base station 110-1, may include the common configuration of the target base station 110-2. In this case, when the UE 120 performs the RRC re-establishment procedure to establish the connection with the target base station 110-2, the configuration of the UE 120 may be updated based at least in part on the common configuration of the target base station 110-2.

When the UE 120 performs the RRC re-establishment procedure to establish the connection with the target base station 110-2, the UE 120 may derive a security key associated with the target base station 110-2. For example, the UE 120 may derive the KgNB security key based at least in part on the current KgNB key and/or an NCC value. In some aspects, the UE 120 may use an NCC value equal to 1 (e.g., vertical derivation using a next hop (NH) parameter) to derive the KgNB security key. In some aspects, the UE 120 may use an NCC value provided by the source base station 110-1, for example in the reduced signaling handover indication, to derive the KgNB security key. In a case in which the NCC value is provided in a group-cast message, the group-cast message may be secured using a group AS key.

In some aspects, the UE 120 may derive a contention free random access preamble and/or a PRACH resource for the RRC re-establishment based reduced signaling handover based at least in part on a C-RNTI associated with the UE 120.

In some aspects, by executing the reduced signaling handover using the RRC re-establishment procedure, the UE 120 may execute the handover from the source base station 110-1 to the target base station 110-2 without transmitting an acknowledgement to the source base station 110-1. In some aspects, when executing the reduced signaling handover using the RRC re-establishment procedure, the UE 120 may not send an RRC reconfiguration complete message to the target base station 110-2 to indicate that the handover has been completed.

In some aspects, the reduced signaling handover may be based at least in part on a handover configuration for the target base station 110-2 included in a pre-configured handover command. The pre-configured handover command may be provided to the UE 120 prior to the occurrence of the reduced signaling handover condition. For example, the pre-configured handover command may be provided to the UE 120 in a configuration message. In some aspects, the reduced signaling handover indication may include a validation of the pre-configured handover command and/or an indication to execute the pre-configured handover command. In this case, the reduced signaling indication may trigger the UE 120 to perform the reduced signaling handover by executing the pre-configured handover command. In some aspects, a time stamp may be associated with the pre-configured handover command. In this case, the UE 120 may determine when to execute the pre-configured handover command based at least in part on the time stamp.

In some aspects, executing the reduced signaling handover may include determining a timing advance associated with the target base station 110-2. The UE 120 may use the timing advance associated with the target base station 110-2 to update a round trip delay associated with the transparent satellite. For example, the UE 120 may adjust a feeder link propagation delay based on the timing advance associated with the target base station 110-2 and continue applying a current pre-compensation to the service link between the UE 120 and the transparent satellite.

In some aspects, the source base station 110-1 may provide, to the UE 120, an indication of the timing advance associated with the target base station 110-2. For example, the source base station 110-1 may transmit an indication of a timing advance adjustment associated with the target base station 110-2 in a UE-specific or group specific indication (e.g., downlink control information (DCI) using a group radio network temporary identifier (RNTI)). If the UE 120 does not receive an indication, the UE 120 may use a current timing advance (e.g., the timing advance associated with the source base station 110-1) as the timing advance associated with the target base station 110-2.

In some aspects, the UE 120 may read system information from a synchronization signal block (SSB) of the target base station 110-2 to a latest common configuration for the target base station 110-2. The system information may include paging information, random access information, and initial pre-compensation values. In this case, the UE 120 may determine the timing advance associated with the target base station 110-2 based at least in part on the initial pre-compensation values in the system information.

In some aspects, the UE 120 may calculate the timing advance associated with the target base station 110-2 based at least in part on a reference signal timing difference between the target base station 110-2 and the source base station 110-1. For example, the UE 120 may calculate the timing advance using the following equation: $TA\_target=TA\_source+2RSTD+\Delta\tau$, where TA_target is the timing advance associated with the target base station 110-2, TA_source is the timing advance associated with the source base station 110-1, and RSTD is the reference signal timing difference between the target base station 110-2 and the source base station 110-1.

As further shown in FIG. 6, and by reference number 645, during the execution of the reduced signaling handover by the UE 120, the source base station 110-1 may send a sequence number (SN) status transfer message to the target base station 110-2. The SN status transfer message may notify the target base station 110-2 regarding a PDCP status associated with the UE 120 and/or a sequence number to be used for a downlink communication with the UE 120.

As further shown in FIG. 6, and by reference number 650, during the execution of the reduced signaling handover by the UE 120, the source base station 110-1 may forward user data associated with the UE 120 to the target base station 110-2. For example, the source base station 110-1 may forward, to the target base station 110-2, buffered downlink communications (e.g., downlink data) for the UE 120. The source base station 110-1 may also forward uplink communications (e.g., uplink data) received from the UE 120.

As further shown in FIG. 6, and by reference number 655, after executing the reduced signaling handover, the UE 120 may monitor for downlink communications from the target base station 110-2. As described above, the UE 120 may not transmit an RRC reconfiguration complete message to the target base station 110-2 to indicate that the reduced signaling handover is complete. The UE 120 may monitor for downlink communications from the target base station 110-2 without transmitting the RRC reconfiguration complete message.

In some aspects, the UE 120 may not transmit any indication to the target base station 110-2 to indicate that the reduced signaling handover is complete. In this case, the UE 120 may begin monitoring for the downlink communications from the target base station 110-2 when a timer associated with the reduced signaling handover has expired. The timer associated with the reduced signaling handover may be used to synchronize the UE 120 and the target base station 110-2 when the UE 120 does not send an indication to the target base station 110-2 to indicate that the reduced signaling handover is complete.

As further shown in FIG. 6, and by reference number 660, the target base station 110-2 may transmit a downlink communication to the UE 120. For example, the target base station 110-2 may transmit downlink data and/or a PDCP status report to the UE 120. In some aspects, the downlink communication may include an RRC reconfiguration message.

In some aspects, the target base station 110-2 may transmit the downlink communication to the UE 120 without receiving an RRC reconfiguration complete message that indicates that the reduced signaling handover is complete. In some aspects, the target base station 110-2 may transmit the downlink communication to the UE 120 without receiving any indication that the reduced signaling handover is complete. In this case, the target base station 110-2 may determine that the UE 120 has completed the reduced signaling handover when the timer associated with the reduced signaling handover has expired. The target base station 110-2 may transmit the downlink communication after the time associated with the reduced signaling handover has expired.

As further shown in FIG. 6, and by reference number 665, the UE 120 may transmit an uplink communication to the target base station 110-2. For example, the UE 120 may transmit uplink data and/or a PDCP status report to the target base station 110-2. If the UE 120 does not have any scheduled uplink resources, the UE 120 may transmit a scheduling request to the target base station 110-2. In some aspects, the UE 120 may transmit the uplink communication to the target base station 110-2 prior to receiving a downlink communication from the target base station 110-2. In this case, the UE 120 may transmit the uplink communication to the target base station 110-2 after the timer associated with the reduced signaling handover has expired. In some aspects, the UE 120 may transmit the uplink communication to the target base station 110-2 without sending an RRC reconfiguration complete message to the target base station 110-2 to indicate that the reduced signaling handover is complete.

In some aspects, the UE 120 may receive a downlink communication from the target base station 110-2 prior to transmitting the uplink communication to the target base station 110-2. In some aspects, the UE 120 may transmit an RRC reconfiguration complete message to the target base station 110-2 after a downlink communication is received by the UE 120 from the target base station 110-2.

As further shown in FIG. 6, and by reference number 670, the target base station 110-2 may determine that the handover and a user plane path switch are complete. The target base station 110-2 may determine that the handover and the user plane path switch are complete based at least in part on the UE 120 receiving a downlink communication from the target base station 110-2 or the target base station 110-2 receiving an uplink communication from the UE 120. Upon completing the switch of the user plane path, the AMF of the core network 605 may transmit an end marker message to the source base station 110-1 to signal completion of the user plane path switch. The target base station 110-2 and the source base station 110-1 may communicate to release the source base station 110-1.

As described above in connection with FIG. 6, the UE 120 may perform a reduced signaling handover when a reduced signaling handover condition occurs. The reduced signaling handover condition may be associated with a group handover of multiple UEs in a cell provided by a transparent satellite. The reduced signaling handover may be performed without transmitting an RRC reconfiguration complete message to the target base station. As a result, congestion in the target base station due to a group handover involving multiple UEs may be reduced. This may reduce network resources and signaling overhead used for the group handover, thus increasing network speed and reliability and conserving computing resources (e.g., processing resources, memory resources, and/or communication resources) and/or networking resources that would otherwise be consumed by additional signaling between the target base station and the UE 120.

As indicated above, FIG. 6 is provided as an example. Other examples may differ from what is described with respect to FIG. 6.

Figure 7:
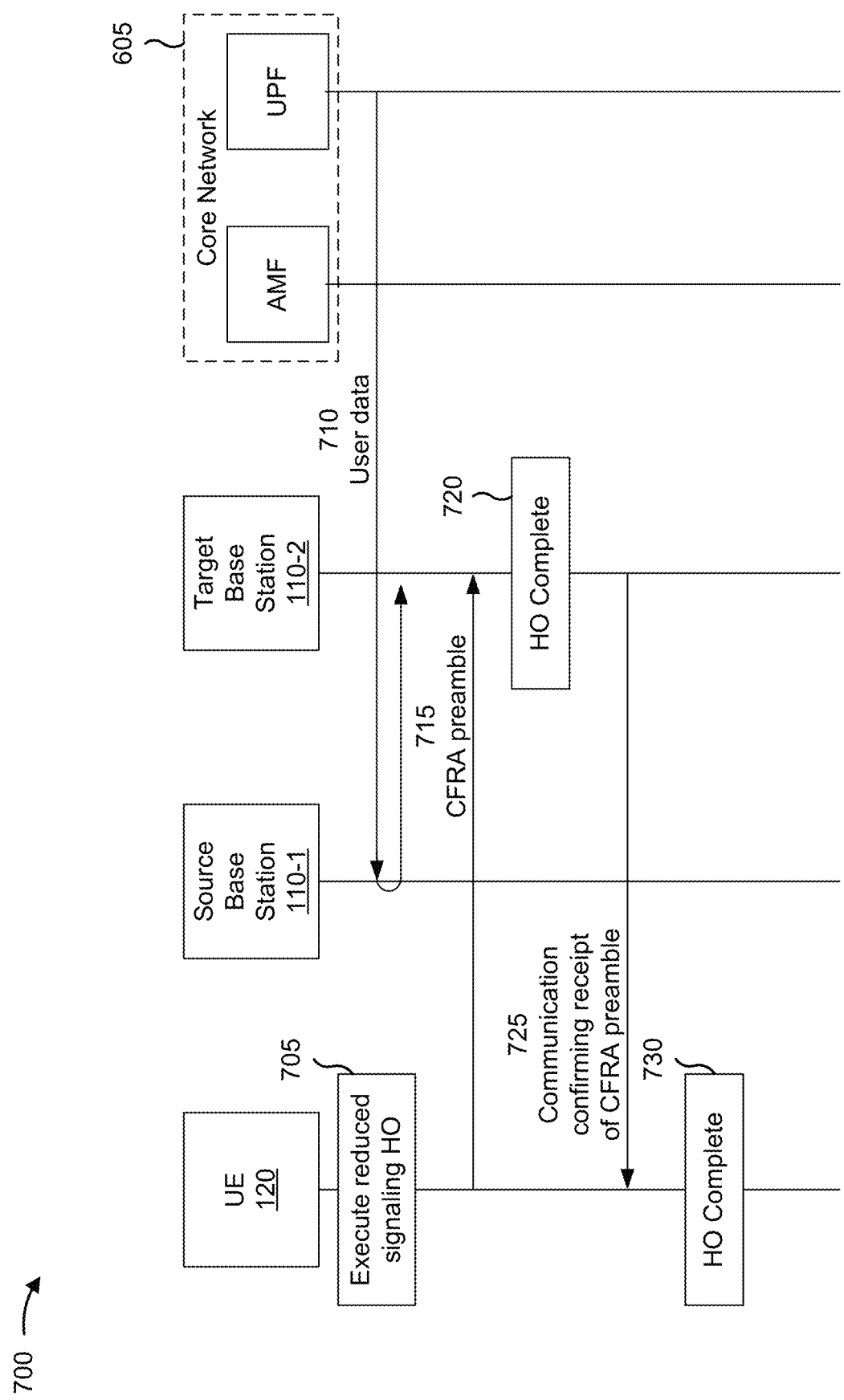

FIG. 7 is a diagram illustrating an example 700 associated with execution of a reduced signaling handover, in accordance with the present disclosure. As shown in FIG. 7, example 700 includes communication between a UE 120, a source base station 110-1 and a target base station 110-2. In some aspects, the UE 120, the source base station 110-1, and the target base station 110-2 may be included in a wireless network, such as wireless network 100. The UE 120, the source base station 110-1, and the target base station 110-2 may communicate on wireless access links, which may include uplinks and downlinks. The source base station 110-1 and the target base station 110-2 may communicate with an AMF and a UPF (or multiple UPFs) in a core network 605 for mobility support and user plane functions.

In some aspects, the UE 120 may communicate with the source base station 110-1 and/or the target base station 110-2 via a transparent satellite (e.g., transparent satellite 440). The UE 120 may transmit uplink communications to the transparent satellite on a service link, and the transparent satellite may transmit the uplink communications to the source base station 110-1 and/or the target base station 110-2 on a feeder link. The source base station 110-1 and/or the target base station 110-2 may transmit downlink communications to the transparent satellite on the feeder link, and the transparent satellite may transmit the downlink communications to the UE 120 on the service link. In some aspects, the UE 120 and one or more other UEs may communicate with the source base station 110-1 and/or the target base station 110-2 via the transparent satellite. In some aspects, the UE 120 (and/or one or more other UEs) may communicate with the source base station 110-1 and/or the target base station 110-2 via a relay device, such as an aircraft, drone, blimp, and/or hot air balloon, among other examples.

As shown in FIG. 7, and by reference number 705, the reduced signaling handover is executed by the UE 120. The reduced signaling handover may be executed by the UE 120 as described above in connection with FIG. 6. The handover preparation prior to the UE 120 executing the reduced signaling handover may also be performed as described above in connection with FIG. 6.

As further shown in FIG. 7, and by reference number 710, during the execution of the reduced signaling handover by the UE 120, the source base station 110-1 may forward user data associated with the UE 120 to the target base station 110-2. For example, the source base station 110-1 may forward, to the target base station 110-2, buffered downlink communications (e.g., downlink data) for the UE 120. The source base station 110-1 may also forward uplink communications (e.g., uplink data) received from the UE 120.

As further shown in FIG. 7, and by reference number 715, the UE 120 may transmit a contention free random access preamble to the target base station 110-2 to provide an indication that the reduced signaling handover is complete. The contention free random access preamble may be provided to the UE 120 by the source base station 110-1. For example, the contention free random access preamble may be included in the reduced signaling handover indication transmitted to the UE 120 by the source base station 110-1. The contention free random access preamble may be used as a unique identifier to identify the UE 120 to the target base station 110-2. The UE 120 may begin monitoring for downlink communications from the target base station 110-2 after transmitting the contention free random access preamble to the target base station 110-2.

As further shown in FIG. 7, and by reference number 720, the target base station 110-2 may determine that the reduced signaling handover has been completed based at least in part on the contention free random access preamble received from the UE 120.

As further shown in FIG. 7 and by reference number 725, the target base station 110-2 may transmit, to the UE 120, a communication that confirms receipt of the contention free random access preamble by the target base station 110-2. For example, the communication may be a timing advance command, a PDCP status report, downlink data, and/or an uplink grant. In some aspects, when a group handover is being performed, the target base station 110-2 may wait and send a random access response (RAR) to multiple UEs (e.g., the UE 120 and one or more other UEs) at the same time. If the UE 120 receives the RAR and does not have uplink data to transmit, the UE 120 may ignore an uplink grant provided in the RAR.

As further shown in FIG. 7, and by reference number 730, the UE 120 may determine that the handover is complete based at least in part on the communication received from the target base station 110-2. Any communication received from the target base station 110-2 may confirm the receipt of the contention free random access preamble by the target base station 110-2. Thus, the UE 120 may determine that the handover is complete when the UE 120 receives any communication from the target base station 110-2. In some aspects, a handover failure timer may start when the UE 120 begins executing the reduced signaling handover. The handover failure timer may stop when the UE 120 receives the communication from the target base station 110-2.

In some aspects, if the handover failure timer expires before the UE 120 receives a communication from the target base station 110-2, a failure of the reduced signaling handover is detected by the UE 120. If a failure of the reduced signaling handover is detected, the UE 120 may connect to a cell associated with a base station for which the UE 120 has a stored handover command or for which the RRC configuration is known. In some aspects, the UE 120 may prioritize a cell to connect to, based at least in part on a visibility of the cell to the UE using information associated with a transparent satellite. In some aspects, if a failure of the reduced signaling handover is detected, the UE 120 may perform the RRC re-establishment procedure using a configuration associated with the target base station.

In the example of FIG. 7, the UE 120 may transmit the contention free random access preamble to the target base station 110-2 to provide an indication that the reduced signaling handover is complete. In some aspects, the UE 120 may begin monitoring for downlink communications from the target base station 110-2 when the reduced signaling handover is executed. For example, the UE 120 may monitor a physical downlink control channel (PDDCH) with a C-RNTI provided in the reduced signaling handover indication. The UE 120 may receive an uplink grant from the target base station 110-2 for an RRC reconfiguration complete message, and use the uplink grant to transmit the RRC reconfiguration complete message to the target base station 110-2 to indicate that the reduced signaling handover is complete. The target base station 110-2 may provide the uplink grant to the UE 120 as a periodic uplink grant. If the UE 120 does not receive the uplink grant within a time limit, the UE 120 may transmit, to the target base station 110-2, a request signal (e.g., a scheduling request) for an uplink grant for the RRC reconfiguration complete message, using a physical uplink control channel resource and/or a random access process. In some aspects, if the UE 120 determines that synchronization with the target base station 110-2 has been lost, in terms of a time and/or frequency compensation requirement, the UE 120 may transmit, to the target base station 110-2, a request signal (e.g., a scheduling request) for an uplink grant for the RRC reconfiguration complete message, using a physical uplink control channel resource and/or a random access process.

In some aspects, the UE 120 may use a RACH-based transmission to send an indication (e.g., the RRC reconfiguration complete message) that the reduced signaling handover is complete to the target base station 110-2. The UE 120 may derive a contention free PRACH resource based at least in part on an indication received from the source base station. After the reduced signaling handover execution, the UE 120 may transmit, to the target base station 110-2, a message to indicate that the reduced signaling handover is complete, using the derived contention free physical random access channel resource.

As indicated above, FIG. 7 is provided as an example. Other examples may differ from what is described with respect to FIG. 7.

Figure 8:
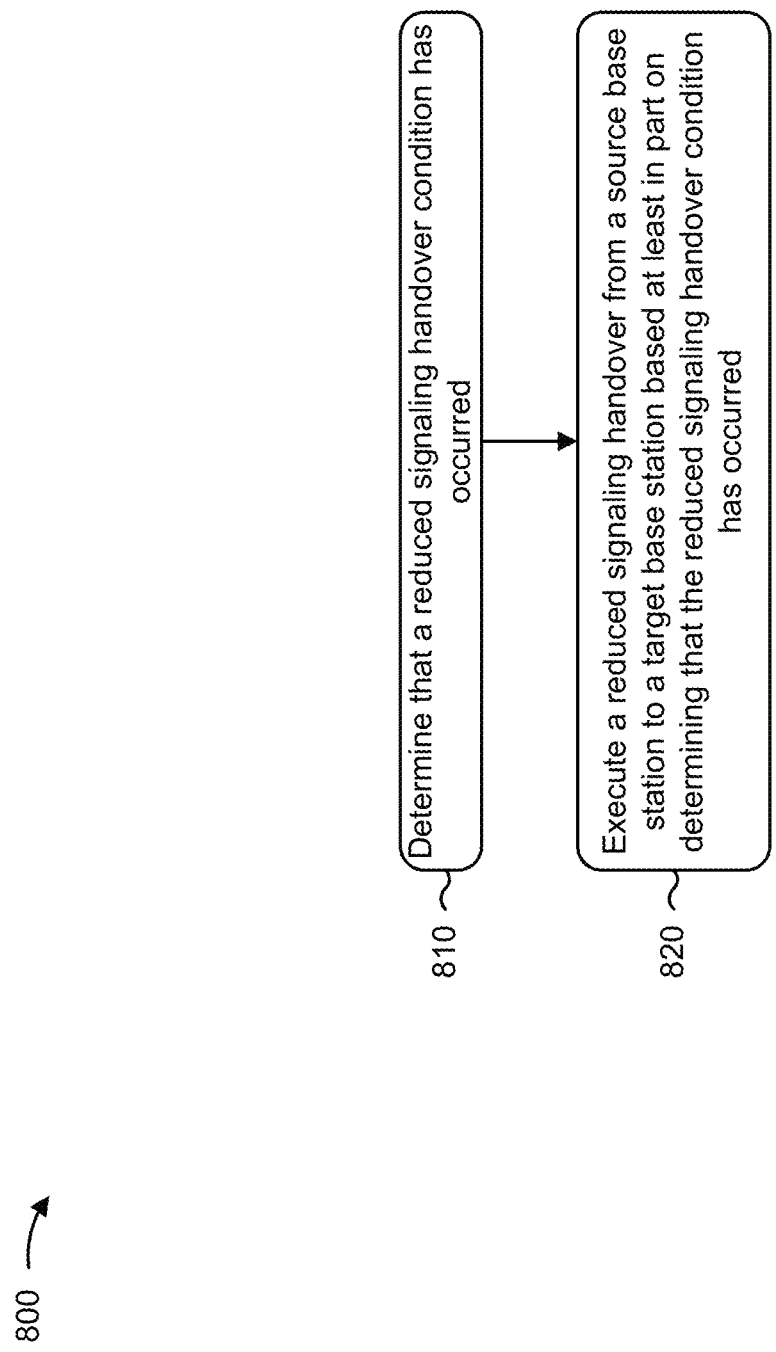
FIGS. 8-9 are diagrams illustrating example processes associated with execution of a reduced signaling handover, in accordance with the present disclosure.

FIG. 8 is a diagram illustrating an example process 800 performed, for example, by UE, in accordance with the present disclosure. Example process 800 is an example where the UE (e.g., UE 120) performs operations associated with execution of a reduced signaling handover.

As shown in FIG. 8, in some aspects, process 800 may include determining that a reduced signaling handover condition has occurred (block 810). For example, the UE (e.g., using antenna 252, demodulator 254, MIMO detector 256, receive processor 258, transmit processor 264, TX MIMO processor 266, modulator 254, controller/processor 280, and/or memory 282) may determine that a reduced signaling handover condition has occurred, as described above.

As further shown in FIG. 8, in some aspects, process 800 may include executing a reduced signaling handover from a source base station to a target base station based at least in part on determining that the reduced signaling handover condition has occurred (block 820). For example, the UE (e.g., using antenna 252, demodulator 254, MIMO detector 256, receive processor 258, transmit processor 264, TX MIMO processor 266, modulator 254, controller/processor 280, and/or memory 282) may execute a reduced signaling handover from a source base station to a target base station based at least in part on determining that the reduced signaling handover condition has occurred, as described above.

Process 800 may include additional aspects, such as any single aspect or any combination of aspects described below and/or in connection with one or more other processes described elsewhere herein.

In a first aspect, determining that the reduced signaling handover condition has occurred comprises receiving a reduced signaling handover indication, wherein the reduced signaling handover indication is at least one of a group handover indication transmitted to the UE and one or more other UEs or a UE specific handover indication transmitted to the UE.

In a second aspect, alone or in combination with the first aspect, the reduced signaling handover indication is received from the source base station via a satellite.

In a third aspect, alone or in combination with one or more of the first and second aspects, determining that the reduced signaling handover condition has occurred comprises receiving a short paging message for at least one of a change in system information, reduced signaling handover, or context relocation.

In a fourth aspect, alone or in combination with one or more of the first through third aspects, determining that the reduced signaling handover condition has occurred comprises determining that the reduced signaling handover condition has occurred based at least in part on at least one of a position of a satellite used to transmit communications between the UE and the source base station or a timer associated with the satellite.

In a fifth aspect, alone or in combination with one or more of the first through fourth aspects, executing the reduced signaling handover from the source base station to the target base station comprises executing a handover from the source base station to the target base station without transmitting a radio resource control reconfiguration complete message to indicate that the handover is complete.

In a sixth aspect, alone or in combination with one or more of the first through fifth aspects, the reduced signaling handover condition is based at least in part on a satellite switching from a feeder link associated with the source base station to a feeder link associated with the target base station.

In a seventh aspect, alone or in combination with one or more of the first through sixth aspects, the reduced signaling handover changes a security key for the UE, updates a round trip delay associated with the satellite, and continues using a current cell radio resource control configuration of the UE.

In an eighth aspect, alone or in combination with one or more of the first through seventh aspects, executing the reduced signaling handover from the source base station to the target base station comprises entering a radio resource control inactive state based at least in part on determining that the reduced signaling handover condition has occurred, and resuming, after entering the radio resource control inactive state, a radio resource control connected state in connection with the target base station.

In a ninth aspect, alone or in combination with one or more of the first through eighth aspects, resuming the radio resource control connected state in connection with the target base station comprises resuming the radio resource control connected state in connection with the target base station using a current configuration of signaling radio bearers and dedicated radio bearers associated with the source base station.

In a tenth aspect, alone or in combination with one or more of the first through ninth aspects, the current configuration of signaling radio bearers and dedicated radio bearers associated with the source base station includes at least one of a dedicated radio bearer to quality of service mapping rule or a robust header compression profile.

In an eleventh aspect, alone or in combination with one or more of the first through tenth aspects, process 800 includes receiving, after resuming the radio resource control connected state in connection with the target base station, at least one of downlink data or a packet data convergence protocol status report from the target base station using the current configuration of signaling radio bearers and dedicated radio bearers associated with the source base station.

In a twelfth aspect, alone or in combination with one or more of the first through eleventh aspects, process 800 includes receiving, from the target base station and after resuming the radio resource control connected state in connection with the target base station, a radio resource control reconfiguration message.

In a thirteenth aspect, alone or in combination with one or more of the first through twelfth aspects, determining that the reduced signaling handover condition has occurred is based at least in part on receiving a reduced signaling handover indication, and resuming the radio resource control connected state in connection with the target base station is based at least in part on a configuration associated with the target base station included in the reduced signaling handover indication.

In a fourteenth aspect, alone or in combination with one or more of the first through thirteenth aspects, resuming the radio resource control connected state in connection with the target base station comprises deriving a security key associated with the target base station based at least in part on the current next hop chaining count value.

In a fifteenth aspect, alone or in combination with one or more of the first through fourteenth aspects, resuming the radio resource control connected state in connection with the target base station comprises deriving a security key associated with the target base station based at least in part on a next hop chaining count value included in a handover indication received from the source base station.

In a sixteenth aspect, alone or in combination with one or more of the first through fifteenth aspects, executing the reduced signaling handover from the source base station to the target base station comprises deriving at least one of a contention free random access preamble or a physical random access channel resource based at least in part on a cell radio network temporary identifier associated with the UE.

In a seventeenth aspect, alone or in combination with one or more of the first through sixteenth aspects, executing the reduced signaling handover from the source base station to the target base station comprises performing a radio resource control re-establishment procedure to establish a connection with the target base station based at least in part on determining that the reduced signaling handover condition has occurred.

In an eighteenth aspect, alone or in combination with one or more of the first through seventeenth aspects, the radio resource control re-establishment procedure is triggered based at least in part on determining that the reduced signaling handover condition has occurred, without the UE transmitting a radio resource control re-establishment request.

In a nineteenth aspect, alone or in combination with one or more of the first through eighteenth aspects, the radio resource control re-establishment procedure is triggered based at least in part on determining that the reduced signaling handover condition has occurred, without the UE receiving a radio resource control re-establishment message.

In a twentieth aspect, alone or in combination with one or more of the first through nineteenth aspects, performing the radio resource control re-establishment procedure comprises deriving a security key associated with the target base station based at least in part on at least one of a current security key associated with the source base station or a next hop chaining count value.

In a twenty-first aspect, alone or in combination with one or more of the first through twentieth aspects, the next hop chaining count value is one of a predetermined next hop chaining count value or a next hop chaining count value included in a handover indication received from the source base station.

In a twenty-second aspect, alone or in combination with one or more of the first through twenty-first aspects, performing the radio resource control re-establishment procedure comprises transmitting a radio resource control re-establishment complete message to the target base station.

In a twenty-third aspect, alone or in combination with one or more of the first through twenty-second aspects, performing the radio resource control re-establishment procedure comprises resuming use of a current configuration of dedicated radio bearers and access stratum security for the UE.

In a twenty-fourth aspect, alone or in combination with one or more of the first through twenty-third aspects, determining that the reduced signaling handover condition has occurred is based at least in part on receiving a handover indication, and performing the radio resource control re-establishment procedure is based at least in part on a configuration associated with the target base station included in the reduced signaling handover indication.

In a twenty-fifth aspect, alone or in combination with one or more of the first through twenty-fourth aspects, executing the reduced signaling handover from the source base station to the target base station comprises deriving at least one of a contention free random access preamble or a physical random access channel resource based at least in part on a cell radio network temporary identifier associated with the UE.

In a twenty-sixth aspect, alone or in combination with one or more of the first through twenty-fifth aspects, executing the reduced signaling handover from the source base station to the target base station is based at least in part on a handover configuration for the target base station included in a pre-configured handover command.

In a twenty-seventh aspect, alone or in combination with one or more of the first through twenty-sixth aspects, determining that that the reduced signaling handover condition has occurred comprises receiving, from the source base station, at least one of a validation of the pre-configured handover command or an indication to execute the pre-configured handover command.

In a twenty-eighth aspect, alone or in combination with one or more of the first through twenty-seventh aspects, determining that that the reduced signaling handover condition has occurred is based at least in part on a time stamp associated with the pre-configured handover command.

In a twenty-ninth aspect, alone or in combination with one or more of the first through twenty-eighth aspects, executing the reduced signaling handover from the source base station to the target base station comprises determining a timing advance associated with the target base station.

In a thirtieth aspect, alone or in combination with one or more of the first through twenty-ninth aspects, determining the timing advance associated with the target base station comprises receiving, from the source base station, an indication of the timing advance associated with the target base station.

In a thirty-first aspect, alone or in combination with one or more of the first through thirtieth aspects, the indication is included in a UE-specific communication from the source base station.

In a thirty-second aspect, alone or in combination with one or more of the first through thirty-first aspects, the indication is included in a group communication transmitted from the source base station to the UE and one or more other UEs.

In a thirty-third aspect, alone or in combination with one or more of the first through thirty-second aspects, determining the timing advance associated with the target base station comprises determining if the timing advance associated with the target base station is received from the source base station, and if the timing advance associated with the target base station is not received from the source base station, using a current timing advance associated with the source base station for the timing advance associated with the target base station.

In a thirty-fourth aspect, alone or in combination with one or more of the first through thirty-third aspects, determining the timing advance associated with the target base station comprises determining the timing advance associated with the target base station based at least in part on a reference signal timing difference between the target base station and the source base station.

In a thirty-fifth aspect, alone or in combination with one or more of the first through thirty-fourth aspects, process 800 includes transmitting, to the target base station, a contention free random access preamble as an indication that the reduced signaling handover is complete.

In a thirty-sixth aspect, alone or in combination with one or more of the first through thirty-fifth aspects, process 800 includes monitoring for downlink communications from the target base station based at least in part on the reduced signaling handover.

In a thirty-seventh aspect, alone or in combination with one or more of the first through thirty-sixth aspects, process 800 includes receiving a downlink communication from the target base station without sending a message to the target base station to indicate that the reduced signaling handover is complete.

In a thirty-eighth aspect, alone or in combination with one or more of the first through thirty-seventh aspects, the downlink communication is a group specific downlink communication transmitted to the UE and one or more other UEs.

In a thirty-ninth aspect, alone or in combination with one or more of the first through thirty-eighth aspects, monitoring for downlink communications from the target base station comprises monitoring for downlink communications from the target base station upon expiration of a timer associated with the reduced signaling handover.

In a fortieth aspect, alone or in combination with one or more of the first through thirty-ninth aspects, process 800 includes receiving an uplink grant from the target base station for a radio resource control reconfiguration complete message to indicate that the reduced signaling handover is complete, and transmitting, to the target base station, the radio resource control reconfiguration complete message to indicate that the reduced signaling handover is complete using the uplink grant.

In a forty-first aspect, alone or in combination with one or more of the first through fortieth aspects, the uplink grant is a periodic uplink grant.

In a forty-second aspect, alone or in combination with one or more of the first through forty-first aspects, process 800 includes determining that no uplink grant has been received from the target base station within a time limit from completion of the reduced signaling handover or that synchronization with the target base station has been lost in terms of at least one of a time or frequency compensation requirement, and transmitting, to the target base station and based at least in part on determining that no uplink grant has been received or that synchronization with the target base station has been lost, a request signal for an uplink grant for a radio resource control reconfiguration complete message to indicate that the reduced signaling handover is complete, using at least one of a physical uplink control channel resource or a random access process.

In a forty-third aspect, alone or in combination with one or more of the first through forty-second aspects, process 800 includes deriving a contention free physical random access channel resource based at least in part on an indication received from the source base station, and transmitting, to the target base station, a message to indicate that the reduced signaling handover is complete, using the contention free physical random access channel resource.

In a forty-fourth aspect, alone or in combination with one or more of the first through forty-third aspects, process 800 includes detecting a failure of the reduced signaling handover based at least in part on expiration of a handover failure timer.

In a forty-fifth aspect, alone or in combination with one or more of the first through forty-fourth aspects, process 800 includes, if a failure of the reduced signaling handover is detected, selecting a cell to connect to, based at least in part on visibility of the cell to the UE using information associated with a satellite.

In a forty-sixth aspect, alone or in combination with one or more of the first through forty-fifth aspects, process 800 includes, if a failure of the reduced signaling handover is detected, performing a radio resource control re-establishment procedure using a configuration associated with the target base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
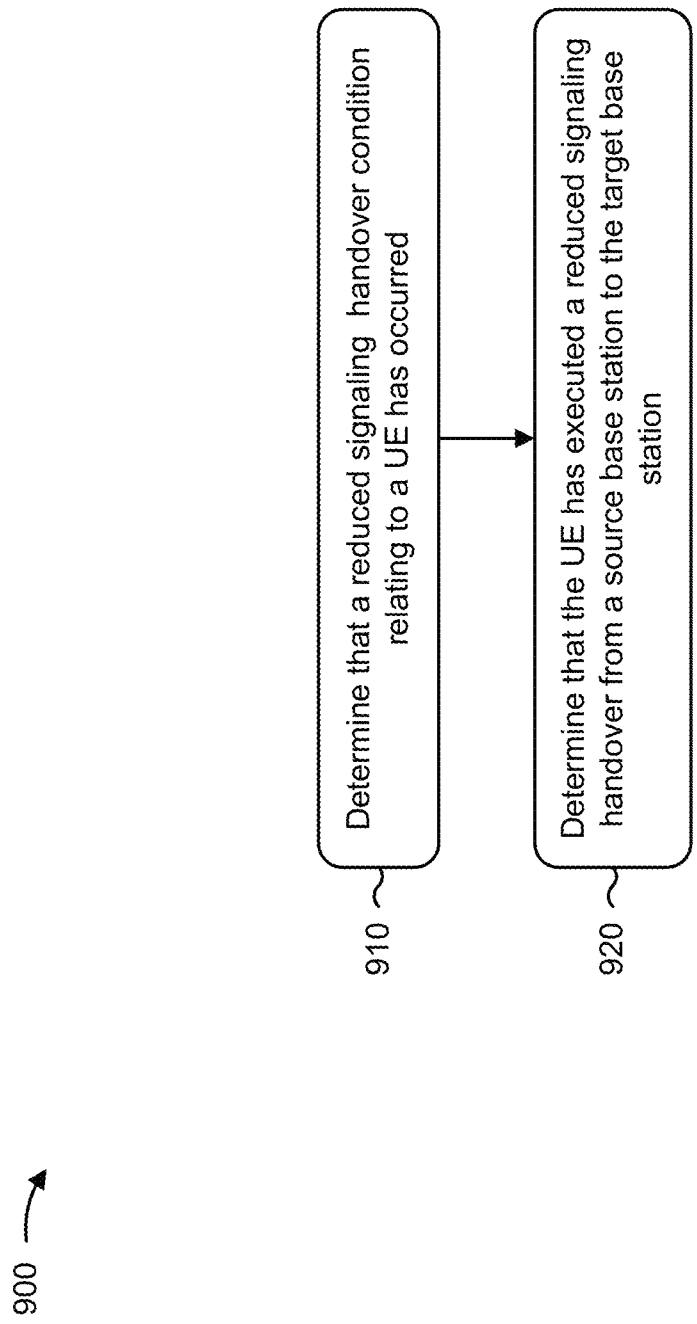

FIG. 9 is a diagram illustrating an example process 900 performed, for example, by a target base station, in accordance with the present disclosure. Example process 900 is an example where the target base station (e.g., target base station 110) performs operations associated with execution of a reduced signaling handover.

As shown in FIG. 9, in some aspects, process 900 may include determining that a reduced signaling handover condition relating to a UE has occurred (block 910). For example, the target base station (e.g., using transmit processor 220, TX MIMO processor 230, modulator 232, antenna 234, demodulator 232, MIMO detector 236, receive processor 238, controller/processor 240, memory 242, and/or scheduler 246) may determine that a reduced signaling handover condition relating to a UE has occurred, as described above.

As further shown in FIG. 9, in some aspects, process 900 may include determining that the UE has executed a reduced signaling handover from a source base station to the target base station (block 920). For example, the target base station (e.g., using transmit processor 220, TX MIMO processor 230, modulator 232, antenna 234, demodulator 232, MIMO detector 236, receive processor 238, controller/processor 240, memory 242, and/or scheduler 246) may determine that the UE has executed a reduced signaling handover from a source base station to the target base station, as described above.

Process 900 may include additional aspects, such as any single aspect or any combination of aspects described below and/or in connection with one or more other processes described elsewhere herein.

In a first aspect, determining that the reduced signaling handover condition has occurred comprises determining that the source base station transmitted a reduced signaling handover indication, wherein the reduced signaling handover indication is at least one of a group handover indication transmitted to the UE and one or more other UEs, or a UE specific handover indication transmitted to the UE.

In a second aspect, alone or in combination with the first aspect, the reduced signaling handover condition is based at least in part on at least one of a position of a satellite used to transmit communications between the UE and the source base station, or a timer associated with the satellite.

In a third aspect, alone or in combination with one or more of the first and second aspects, determining that the UE has executed the reduced signaling handover comprises determining that the UE has executed the reduced signaling handover without receiving a radio resource control reconfiguration complete message from the UE.

In a fourth aspect, alone or in combination with one or more of the first through third aspects, the reduced signaling handover condition is based at least in part on a satellite switching from a feeder link associated with the source base station to a feeder link associated with the target base station.

In a fifth aspect, alone or in combination with one or more of the first through fourth aspects, the reduced signaling handover changes a security key for the UE, updates a round trip delay associated with the satellite, and continues using a current cell radio resource control configuration of the UE.

In a sixth aspect, alone or in combination with one or more of the first through fifth aspects, determining that the UE has executed the reduced signaling handover comprises determining that a timer associated with the reduced signaling handover has expired.

In a seventh aspect, alone or in combination with one or more of the first through sixth aspects, process 900 includes transmitting, after the timer associated with the reduced signaling handover has expired, at least one of downlink data or a packet data convergence protocol status report to the UE using a current configuration of signaling radio bearers and dedicated radio bearers associated with the source base station.

In an eighth aspect, alone or in combination with one or more of the first through seventh aspects, process 900 includes transmitting, to the UE after the timer associated with the reduced signaling handover has expired, a radio resource control reconfiguration message.

In a ninth aspect, alone or in combination with one or more of the first through eighth aspects, determining that the UE has executed the reduced signaling handover comprises receiving a radio resource control re-establishment complete message from the UE based at least in part on a radio resource control procedure performed by the UE.

In a tenth aspect, alone or in combination with one or more of the first through ninth aspects, determining that the UE has executed the reduced signaling handover comprises receiving, from the UE, a contention free random access preamble as an indication that the reduced signaling handover is complete.

In an eleventh aspect, alone or in combination with one or more of the first through tenth aspects, process 900 includes transmitting a downlink communication to the UE without receiving a message from the UE to indicate that the reduced signaling handover is complete.

In a twelfth aspect, alone or in combination with one or more of the first through eleventh aspects, the downlink communication is a group specific downlink communication transmitted to the UE and one or more other UEs.

In a thirteenth aspect, alone or in combination with one or more of the first through twelfth aspects, process 900 includes transmitting, to the UE, an uplink grant, and receiving, from the UE, a radio resource control reconfiguration complete message to indicate that the reduced signaling handover is complete using the uplink grant.

In a fourteenth aspect, alone or in combination with one or more of the first through thirteenth aspects, the uplink grant is a periodic uplink grant.

In a fifteenth aspect, alone or in combination with one or more of the first through fourteenth aspects, process 900 includes receiving, from the UE, a scheduling request for the uplink grant.

In a sixteenth aspect, alone or in combination with one or more of the first through fifteenth aspects, process 900 includes receiving, from the UE, a message to indicate that the reduced signaling handover is complete, wherein the message is received via a contention free physical random access channel resource derived by the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: determining that a reduced signaling handover condition has occurred; and executing a reduced signaling handover from a source base station to a target base station based at least in part on determining that the reduced signaling handover condition has occurred.

Aspect 2: The method of Aspect 1, wherein determining that the reduced signaling handover condition has occurred comprises: receiving a reduced signaling handover indication, wherein the reduced signaling handover indication is at least one of a group handover indication transmitted to the UE and one or more other UEs or a UE specific handover indication transmitted to the UE.

Aspect 3: The method of Aspect 2, wherein the reduced signaling handover indication is received from the source base station via a satellite.

Aspect 4: The method of any of Aspects 1-3, wherein determining that the reduced signaling handover condition has occurred comprises: receiving a paging message for at least one of a change in system information, reduced signaling handover, or context relocation.

Aspect 5: The method of any of Aspects 1-4, wherein determining that the reduced signaling handover condition has occurred comprises: determining that the reduced signaling handover condition has occurred based at least in part on at least one of a position of the satellite used to transmit communications between the UE and the source base station or a timer associated with the satellite.

Aspect 6: The method of any of Aspects 1-5, wherein executing the reduced signaling handover from the source base station to the target base station comprises: executing a handover from the source base station to the target base station without transmitting a radio resource control reconfiguration complete message to indicate that the handover is complete.

Aspect 7: The method of Aspect 6, further comprising: transmitting a random access preamble to the target base station; and receiving, from the target base station, a random access response that provides a handover complete acknowledgement.

Aspect 8: The method of any of Aspects 1-7, wherein the reduced signaling handover condition is based at least in part on the satellite switching from a feeder link associated with the source base station to a feeder link associated with the target base station.

Aspect 9: The method of Aspect 8, wherein the reduced signaling handover changes a security key for the UE, updates a round trip delay associated with the satellite, and continues using a current cell radio resource control configuration of the UE.

Aspect 10: The method of any of Aspects 1-9, wherein executing the reduced signaling handover from the source base station to the target base station comprises: entering a radio resource control inactive state based at least in part on determining that the reduced signaling handover condition has occurred; and resuming, after entering the radio resource control inactive state, a radio resource control connected state in connection with the target base station.

Aspect 11: The method of Aspect 10, wherein resuming the radio resource control connected state in connection with the target base station comprises: resuming the radio resource control connected state in connection with the target base station using a current configuration of signaling radio bearers and dedicated radio bearers associated with the source base station.

Aspect 12: The method of Aspect 11, wherein the current configuration of signaling radio bearers and dedicated radio bearers associated with the source base station includes at least one of a dedicated radio bearer to quality of service mapping rule or a robust header compression profile.

Aspect 13: The method of any of Aspects 11-12, further comprising: receiving, after resuming the radio resource control connected state in connection with the target base station, at least one of downlink data or a packet data convergence protocol status report from the target base station using the current configuration of signaling radio bearers and dedicated radio bearers associated with the source base station.

Aspect 14: The method of any of Aspects 11-13, further comprising: receiving, from the target base station and after resuming the radio resource control connected state in connection with the target base station, a radio resource control reconfiguration message.

Aspect 15: The method of any of Aspects 10-14, wherein determining that the reduced signaling handover condition has occurred is based at least in part on receiving a reduced signaling handover indication, and resuming the radio resource control connected state in connection with the target base station is based at least in part on a configuration associated with the target base station included in the reduced signaling handover indication.

Aspect 16: The method of any of Aspects 10-15, wherein resuming the radio resource control connected state in connection with the target base station comprises: deriving a security key associated with the target base station based at least in part on a current next hop chaining count value.

Aspect 17: The method of any of Aspects 10-16, wherein resuming the radio resource control connected state in connection with the target base station comprises: deriving a security key associated with the target base station based at least in part on a next hop chaining count value included in a handover indication received from the source base station.

Aspect 18: The method of any of Aspects 10-17, wherein executing the reduced signaling handover from the source base station to the target base station comprises: deriving at least one of a contention free random access preamble or a physical random access channel resource based at least in part on a cell radio network temporary identifier associated with the UE.

Aspect 19: The method of any of Aspects 1-18, wherein executing the reduced signaling handover from the source base station to the target base station comprises: performing a radio resource control re-establishment procedure to establish a connection with the target base station based at least in part on determining that the reduced signaling handover condition has occurred.

Aspect 20: The method of Aspect 19, wherein the radio resource control re-establishment procedure is triggered based at least in part on determining that the reduced signaling handover condition has occurred, without the UE transmitting a radio resource control re-establishment request.

Aspect 21: The method of Aspect 20, wherein the radio resource control re-establishment procedure is triggered based at least in part on determining that the reduced signaling handover condition has occurred, without the UE receiving a radio resource control re-establishment message.

Aspect 22: The method of any of Aspects 19-21, wherein performing the radio resource control re-establishment procedure comprises: deriving a security key associated with the target base station based at least in part on at least one of a current security key associated with the source base station or a next hop chaining count value.

Aspect 23: The method of Aspect 22, wherein the next hop chaining count value is one of a predetermined next hop chaining count value or a next hop chaining count value included in a handover indication received from the source base station.

Aspect 24: The method of any of Aspects 19-23, wherein performing the radio resource control re-establishment procedure comprises: transmitting a radio resource control re-establishment complete message to the target base station.

Aspect 25: The method of any of Aspects 19-24, wherein performing the radio resource control re-establishment procedure comprises: resuming use of a current configuration of dedicated radio bearers and access stratum security for the UE.

Aspect 26: The method of any of Aspects 19-25, wherein determining that the reduced signaling handover condition has occurred is based at least in part on receiving a handover indication, and performing the radio resource control re-establishment procedure is based at least in part on a configuration associated with the target base station included in the reduced signaling handover indication.

Aspect 27: The method of any of Aspects 19-26, wherein executing the reduced signaling handover from the source base station to the target base station comprises: deriving at least one of a contention free random access preamble or a physical random access channel resource based at least in part on a cell radio network temporary identifier associated with the UE.

Aspect 28: The method of any of Aspects 1-27, wherein executing the reduced signaling handover from the source base station to the target base station is based at least in part on a handover configuration for the target base station included in a pre-configured handover command.

Aspect 29: The method of Aspect 28, wherein determining that that the reduced signaling handover condition has occurred comprises: receiving, from the source base station, at least one of a validation of the pre-configured handover command or an indication to execute the pre-configured handover command.

Aspect 30: The method of any of Aspects 28-29, wherein determining that that the reduced signaling handover condition has occurred is based at least in part on a time stamp associated with the pre-configured handover command.

Aspect 31: The method of any of Aspects 1-30, wherein executing the reduced signaling handover from the source base station to the target base station comprises: determining a timing advance associated with the target base station.

Aspect 32: The method of Aspect 31, wherein determining the timing advance associated with the target base station comprises: receiving, from the source base station, an indication of the timing advance associated with the target base station.

Aspect 33: The method of Aspect 32, wherein the indication is included in a UE-specific communication from the source base station.

Aspect 34: The method of any of Aspects 32-33, wherein the indication is included in a group communication transmitted from the source base station to the UE and one or more other UEs.

Aspect 35: The method of any of Aspects 31-34, wherein determining the timing advance associated with the target base station comprises: determining if the timing advance associated with the target base station is received from the source base station; and if the timing advance associated with the target base station is not received from the source base station, using a current timing advance associated with the source base station for the timing advance associated with the target base station.

Aspect 36: The method of any of Aspects 31-35, wherein determining the timing advance associated with the target base station comprises: determining the timing advance associated with the target base station based at least in part on a reference signal timing difference between the target base station and the source base station.

Aspect 37: The method of any of Aspects 1-36, further comprising: transmitting, to the target base station, a contention free random access preamble as an indication that the reduced signaling handover is complete.

Aspect 38: The method of any of Aspects 1-37, further comprising: monitoring for downlink communications from the target base station based at least in part on the reduced signaling handover.

Aspect 39: The method of Aspect 38, further comprising: receiving a downlink communication from the target base station without sending a message to the target base station to indicate that the reduced signaling handover is complete.

Aspect 40: The method Aspect 39, further comprising transmitting a random access preamble to the target base station, wherein receiving the downlink communication from the target base station comprises: receiving, from the target base station, a random access response indicating that the reduced signaling handover is complete.

Aspect 41: The method of Aspect 39, wherein the downlink communication is a group specific downlink communication transmitted to the UE and one or more other UEs.

Aspect 42: The method of any of Aspects 38-41, wherein monitoring for downlink communications from the target base station comprises: monitoring for downlink communications from the target base station upon expiration of a timer associated with the reduced signaling handover.

Aspect 43: The method of any of Aspects 38-42, further comprising: receiving an uplink grant from the target base station for a radio resource control reconfiguration complete message to indicate that the reduced signaling handover is complete; and transmitting, to the target base station, the radio resource control reconfiguration complete message to indicate that the reduced signaling handover is complete using the uplink grant.

Aspect 44: The method of Aspect 43, wherein the uplink grant is a periodic uplink grant.

Aspect 45: The method of any of Aspects 38-44, further comprising: determining that no uplink grant has been received from the target base station within a time limit from completion of the reduced signaling handover or that synchronization with the target base station has been lost in terms of at least one of a time or frequency compensation requirement; and transmitting, to the target base station and based at least in part on determining that no uplink grant has been received or that synchronization with the target base station has been lost, a request signal for an uplink grant for a radio resource control reconfiguration complete message to indicate that the reduced signaling handover is complete, using at least one of a physical uplink control channel resource or a random access process.

Aspect 46: The method of any of Aspects 1-45, further comprising: deriving a contention free physical random access channel resource based at least in part on an indication received from the source base station; and transmitting, to the target base station, a message to indicate that the reduced signaling handover is complete, using the contention free physical random access channel resource.

Aspect 47: The method of any of Aspects 1-46, further comprising: detecting a failure of the reduced signaling handover based at least in part on expiration of a handover failure timer.

Aspect 48: The method of Aspect 47, further comprising: if a failure of the reduced signaling handover is detected, selecting a cell to connect to based at least in part on visibility of the cell to the UE using information associated with the satellite.

Aspect 49: The method of any of Aspects 47-48, further comprising: if a failure of the reduced signaling handover is detected, performing a radio resource control re-establishment procedure using a configuration associated with the target base station.

Aspect 50: A method of wireless communication performed by a target base station, comprising: determining that a reduced signaling handover condition relating to a user equipment (UE) has occurred; and determining that the UE has executed a reduced signaling handover from a source base station to the target base station.

Aspect 51: The method of Aspect 50, wherein determining that the reduced signaling handover condition has occurred comprises: determining that the source base station transmitted a reduced signaling handover indication, wherein the reduced signaling handover indication is at least one of a group handover indication transmitted to the UE and one or more other UEs or a UE specific handover indication transmitted to the UE.

Aspect 52: The method of any of Aspects 50-51, wherein the reduced signaling handover condition is based at least in part on at least one of a position of a satellite used to transmit communications between the UE and the source base station or a timer associated with the satellite.

Aspect 53: The method of any of Aspects 50-52, wherein determining that the UE has executed the reduced signaling handover comprises: determining that the UE has executed the reduced signaling handover without receiving a radio resource control reconfiguration complete message from the UE.

Aspect 54: The method of any of Aspects 50-53, wherein the reduced signaling handover condition is based at least in part on the satellite switching from a feeder link associated with the source base station to a feeder link associated with the target base station.

Aspect 55: The method of Aspect 54, wherein the reduced signaling handover changes a security key for the UE, updates a round trip delay associated with the satellite, and continues using a current cell radio resource control configuration of the UE.

Aspect 56: The method of any of Aspects 50-55, wherein determining that the UE has executed the reduced signaling handover comprises: determining that a timer associated with the reduced signaling handover has expired.

Aspect 57: The method of Aspect 56, further comprising: transmitting, after the timer associated with the reduced signaling handover has expired, at least one of downlink data or a packet data convergence protocol status report to the UE using a current configuration of signaling radio bearers and dedicated radio bearers associated with the source base station.

Aspect 58: The method of any of Aspects 50-57, further comprising: transmitting, to the UE after the timer associated with the reduced signaling handover has expired, a radio resource control reconfiguration message.

Aspect 59: The method of any of Aspects 50-58, wherein determining that the UE has executed the reduced signaling handover comprises: receiving a radio resource control re-establishment complete message from the UE based at least in part on a radio resource control procedure performed by the UE.

Aspect 60: The method of any of Aspects 50-59, wherein determining that the UE has executed the reduced signaling handover comprises: receiving, from the UE, a contention free random access preamble as an indication that the reduced signaling handover is complete.

Aspect 61: The method of any of Aspects 50-60, further comprising: transmitting a downlink communication to the UE without receiving a message from the UE to indicate that the reduced signaling handover is complete.

Aspect 62: The method of Aspect 61, wherein the downlink communication is a group specific downlink communication transmitted to the UE and one or more other UEs.

Aspect 63: The method of any of Aspects 50-62, further comprising: transmitting, to the UE, an uplink grant; and receiving, from the UE, a radio resource control reconfiguration complete message to indicate that the reduced signaling handover is complete using the uplink grant.

Aspect 64: The method of Aspect 63, wherein the uplink grant is a periodic uplink grant.

Aspect 65: The method of any of Aspects 63-64, further comprising: receiving, from the UE, a scheduling request for the uplink grant.

Aspect 66: The method of any of Aspects 50-65, further comprising: receiving, from the UE, a message to indicate that the reduced signaling handover is complete, wherein the message is received via a contention free physical random access channel resource derived by the UE.

Aspect 67: An apparatus for wireless communication at a device, comprising a processor; memory coupled with the processor; and instructions stored in the memory and executable by the processor to cause the apparatus to perform the method of one or more of Aspects 1-49.

Aspect 68: An apparatus for wireless communication at a device, comprising a processor; memory coupled with the processor; and instructions stored in the memory and executable by the processor to cause the apparatus to perform the method of one or more of Aspects 50-66.

Aspect 69: A device for wireless communication, comprising a memory and one or more processors coupled to the memory, the one or more processors configured to perform the method of one or more of Aspects 1-49.

Aspect 70: A device for wireless communication, comprising a memory and one or more processors coupled to the memory, the one or more processors configured to perform the method of one or more of Aspects 50-66.

Aspect 71: An apparatus for wireless communication, comprising at least one means for performing the method of one or more of Aspects 1-49.

Aspect 72: An apparatus for wireless communication, comprising at least one means for performing the method of one or more of Aspects 50-66.

Aspect 73: A non-transitory computer-readable medium storing code for wireless communication, the code comprising instructions executable by a processor to perform the method of one or more of Aspects 1-49.

Aspect 74: A non-transitory computer-readable medium storing code for wireless communication, the code comprising instructions executable by a processor to perform the method of one or more of Aspects 50-66.

Aspect 75: A non-transitory computer-readable medium storing a set of instructions for wireless communication, the set of instructions comprising one or more instructions that, when executed by one or more processors of a device, cause the device to perform the method of one or more of Aspects 1-49.

Aspect 76: A non-transitory computer-readable medium storing a set of instructions for wireless communication, the set of instructions comprising one or more instructions that, when executed by one or more processors of a device, cause the device to perform the method of one or more of Aspects 50-66.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
a memory comprising instructions; and
one or more processors configured to execute the instructions and cause the UE to:
  determine that a reduced signaling handover condition has occurred; and
  execute a reduced signaling handover from a source base station to a target base station based at least in part on determining that the reduced signaling handover condition has occurred, wherein
    the reduced signaling handover changes a security key for the UE, updates a round trip delay associated with a satellite, and continues using a cell radio resource control configuration.

2. The UE of claim 1, further comprising a transceiver, wherein the one or more processors, to determine that the reduced signaling handover condition has occurred, are configured to cause the UE to:
receive, via the transceiver, at least one of:
  a reduced signaling handover indication, wherein the reduced signaling handover indication is at least one of a group handover indication transmitted to the UE and one or more other UEs or a UE specific handover indication transmitted to the UE, or
  a short paging message for at least one of a change in system information, reduced signaling handover, or context relocation.

3. The UE of claim 1, wherein the one or more processors, to determine that the reduced signaling handover condition has occurred, are configured to cause the UE to:
determine that the reduced signaling handover condition has occurred based at least in part on at least one of a position of a satellite used to transmit communications between the UE and the source base station or a timer associated with the satellite.

4. The UE of claim 1, further comprising a transceiver, wherein the one or more processors, to execute the reduced signaling handover from the source base station to the target base station, are configured to cause the UE to execute, via the transceiver, a handover from the source base station to the target base station without transmitting a radio resource control reconfiguration complete message to indicate that the handover is complete, and wherein the one or more processors are further configured to cause the UE to:
  transmit, via the transceiver, a random access preamble to the target base station; and
  receive, via the transceiver from the target base station, a random access response that provides a handover complete acknowledgement.

5. The UE of claim 1, wherein the one or more processors, to execute the reduced signaling handover from the source base station to the target base station, are configured to cause the UE to:
  enter a radio resource control inactive state based at least in part on determining that the reduced signaling handover condition has occurred; and
  resume, after entering the radio resource control inactive state, a radio resource control connected state in connection with the target base station.

6. The UE of claim 1, wherein the one or more processors, to execute the reduced signaling handover from the source base station to the target base station, are configured to cause the UE to:
  perform a radio resource control re-establishment procedure to establish a connection with the target base station based at least in part on determining that the reduced signaling handover condition has occurred.

7. The UE of claim 1, wherein the one or more processors, to execute the reduced signaling handover from the source base station to the target base station, are configured to cause the UE to:
  execute the reduced signaling handover from the source base station to the target base station based at least in part on a handover configuration for the target base station included in a pre-configured handover command.

8. The UE of claim 1, wherein the one or more processors, to execute the reduced signaling handover from the source base station to the target base station, are configured to cause the UE to:
  determine a timing advance associated with the target base station.

9. The UE of claim 1, further comprising a transceiver, wherein the one or more processors are further configured to cause the UE to:
  transmit, via the transceiver to the target base station, a contention free random access preamble as an indication that the reduced signaling handover is complete.

10. The UE of claim 1, further comprising a transceiver, wherein the one or more processors are further configured to cause the UE to:
  monitor for downlink communications from the target base station based at least in part on the reduced signaling handover; and
  receive, via the transceiver, a downlink communication from the target base station without sending a message to the target base station to indicate that the reduced signaling handover is complete.

11. The UE of claim 10, further comprising a transceiver, wherein the one or more processors are further configured to transmit a random access preamble to the target base station, and wherein the one or more processors, to receive the downlink communication from the target base station, are configured to cause the UE to:
  receive, via the transceiver from the target base station, a random access response indicating that the reduced signaling handover is complete.

12. The UE of claim 10, wherein the one or more processors, to monitor for downlink communications from the target base station, are configured to cause the UE to:
  monitor for downlink communications from the target base station upon expiration of a timer associated with the reduced signaling handover.

13. The UE of claim 10, further comprising a transceiver, wherein the one or more processors are further configured to cause the UE to:
  receive, via the transceiver, an uplink grant from the target base station for a radio resource control reconfiguration complete message to indicate that the reduced signaling handover is complete; and
  transmit, via the transceiver to the target base station, the radio resource control reconfiguration complete message to indicate that the reduced signaling handover is complete using the uplink grant.

14. The UE of claim 10, further comprising a transceiver, wherein the one or more processors are further configured to cause the UE to:
  determine that no uplink grant has been received from the target base station within a time limit from completion of the reduced signaling handover or that synchronization with the target base station has been lost in terms of at least one of a time or frequency compensation requirement; and
  transmit, via the transceiver to the target base station and based at least in part on determining that no uplink grant has been received or that synchronization with the target base station has been lost, a request signal for an uplink grant for a radio resource control reconfiguration complete message to indicate that the reduced signaling handover is complete, using at least one of a physical uplink control channel resource or a random access process.

15. The UE of claim 10, further comprising a transceiver, wherein the one or more processors are further configured to cause the UE to:
  derive a contention free physical random access channel resource based at least in part on an indication received from the source base station; and
  transmit, via the transceiver to the target base station, a message to indicate that the reduced signaling handover is complete, using the contention free physical random access channel resource.

16. An apparatus for wireless communication, comprising:
  a memory comprising instructions; and
  one or more processors configured to execute the instructions and cause the apparatus to:
    determine that a reduced signaling handover condition has occurred, wherein the reduced signaling handover condition is based at least in part on a satellite switching from a feeder link associated with a source base station to a feeder link associated with a target base station; and
    execute a reduced signaling handover from the source base station to the target base station based at least in part on determining that the reduced signaling handover condition has occurred, wherein the reduced signaling handover changes a security key for the apparatus, updates a round trip delay associated with the satellite, and continues using a cell radio resource control configuration.

17. The apparatus of claim 16, further comprising:
a transceiver, wherein the one or more processors are configured to cause the apparatus to execute the reduced signaling handover via the transceiver and further wherein the apparatus is configured as a user equipment.

18. An apparatus for wireless communication, comprising:
a memory comprising instructions; and
one or more processors configured to execute the instructions and cause the apparatus to:
determine that a reduced signaling handover condition has occurred; and
execute a reduced signaling handover from a source base station to a target base station based at least in part on determining that the reduced signaling handover condition has occurred, wherein the reduced signaling handover changes a security key for the apparatus, updates a round trip delay associated with a satellite, and continues using a cell radio resource control configuration.

19. The apparatus of claim 18, further comprising:
a transceiver, wherein the one or more processors are configured to cause the apparatus to execute the reduced signaling handover via the transceiver and further wherein the apparatus is configured as a user equipment.

20. A user equipment (UE), comprising:
a transceiver;
a memory comprising instructions; and
one or more processors configured to execute the instructions and cause the UE to:
receive an indication that a reduced signaling handover condition has occurred, the indication including at least one of a validation of a pre-configured handover command or an indication to execute the pre-configured handover command; and
execute a reduced signaling handover from a source base station to a target base station based at least in part on the received indication, wherein the reduced signaling handover changes a security key for the UE, updates a round trip delay associated with a satellite, and continues using a cell radio resource control configuration.

21. The UE of claim 20, wherein the indication includes at least one of:
a validation of a pre-configured handover command;
an indication to execute the pre-configured handover command;
a reduced signaling handover indication, wherein the reduced signaling handover indication is at least one of a group handover indication transmitted to the UE and one or more other UEs or a UE specific handover indication transmitted to the UE; or
a short paging message for at least one of a change in system information, reduced signaling handover, or context relocation.

22. The UE of claim 20, wherein the one or more processors, to execute the reduced signaling handover from the source base station to the target base station, are configured to cause the UE to execute, via the transceiver, a handover from the source base station to the target base station without transmitting a radio resource control reconfiguration complete message to indicate that the handover is complete, and wherein the one or more processors are further configured to cause the UE to:
transmit, via the transceiver, a random access preamble to the target base station; and
receive, via the transceiver from the target base station, a random access response that provides a handover complete acknowledgement.

23. The UE of claim 20, wherein the one or more processors, to execute the reduced signaling handover from the source base station to the target base station, are configured to cause the UE to:
enter a radio resource control inactive state based at least in part on determining that the reduced signaling handover condition has occurred; and
resume, after entering the radio resource control inactive state, a radio resource control connected state in connection with the target base station.

24. The UE of claim 20, wherein the one or more processors, to execute the reduced signaling handover from the source base station to the target base station, are configured to cause the UE to:
perform a radio resource control re-establishment procedure to establish a connection with the target base station based at least in part on determining that the reduced signaling handover condition has occurred.

25. The UE of claim 20, wherein the one or more processors, to execute the reduced signaling handover from the source base station to the target base station, are configured to cause the UE to:
execute the reduced signaling handover from the source base station to the target base station based at least in part on a handover configuration for the target base station included in a pre-configured handover command.

26. The UE of claim 20, wherein the one or more processors, to execute the reduced signaling handover from the source base station to the target base station, are configured to cause the UE to:
determine a timing advance associated with the target base station.

27. The UE of claim 20, wherein the one or more processors are further configured to cause the UE to:
transmit, via the transceiver to the target base station, a contention free random access preamble as an indication that the reduced signaling handover is complete.

28. The UE of claim 20, wherein the one or more processors are further configured to cause the UE to:
monitor for downlink communications from the target base station based at least in part on the reduced signaling handover; and
receive, via the transceiver, a downlink communication from the target base station without sending a message to the target base station to indicate that the reduced signaling handover is complete.

29. The UE of claim 28, wherein the one or more processors are further configured to transmit a random access preamble to the target base station, and wherein the one or more processors, to receive the downlink communication from the target base station, are configured to cause the UE to:
receive, via the transceiver from the target base station, a random access response indicating that the reduced signaling handover is complete.

30. The UE of claim 28, wherein the one or more processors, to monitor for downlink communications from the target base station, are configured to cause the UE to:

monitor for downlink communications from the target base station upon expiration of a timer associated with the reduced signaling handover.

31. The UE of claim 28, wherein the one or more processors are further configured to cause the UE to:
receive, via the transceiver, an uplink grant from the target base station for a radio resource control reconfiguration complete message to indicate that the reduced signaling handover is complete; and
transmit, via the transceiver to the target base station, the radio resource control reconfiguration complete message to indicate that the reduced signaling handover is complete using the uplink grant.

32. The UE of claim 28, wherein the one or more processors are further configured to cause the UE to:
determine that no uplink grant has been received from the target base station within a time limit from completion of the reduced signaling handover or that synchronization with the target base station has been lost in terms of at least one of a time or frequency compensation requirement; and
transmit, via the transceiver to the target base station and based at least in part on determining that no uplink grant has been received or that synchronization with the target base station has been lost, a request signal for an uplink grant for a radio resource control reconfiguration complete message to indicate that the reduced signaling handover is complete, using at least one of a physical uplink control channel resource or a random access process.

33. The UE of claim 28, wherein the one or more processors are further configured to cause the UE to:
derive a contention free physical random access channel resource based at least in part on an indication received from the source base station; and
transmit, via the transceiver to the target base station, a message to indicate that the reduced signaling handover is complete, using the contention free physical random access channel resource.

* * * * *